(12) United States Patent
Wallace

(10) Patent No.: US 11,061,165 B2
(45) Date of Patent: Jul. 13, 2021

(54) SYSTEM, METHOD AND APPARATUS FOR EXPLORATION

(76) Inventor: Chester A. Wallace, Morrison, CO (US)

(*) Notice: Subject to any disclaimer, the term of this patent is extended or adjusted under 35 U.S.C. 154(b) by 197 days.

(21) Appl. No.: 12/415,157

(22) Filed: Mar. 31, 2009

(65) Prior Publication Data

US 2010/0086180 A1    Apr. 8, 2010

Related U.S. Application Data

(60) Provisional application No. 61/103,856, filed on Oct. 8, 2008.

(51) Int. Cl.
| | | |
|---|---|---|
| *G01V 1/00* | (2006.01) | |
| *G01V 9/02* | (2006.01) | |
| *E21B 43/16* | (2006.01) | |
| *E21B 49/08* | (2006.01) | |
| *G01V 9/00* | (2006.01) | |
| *G06K 9/00* | (2006.01) | |
| *G01C 21/00* | (2006.01) | |

(52) U.S. Cl.
CPC .......... *G01V 9/00* (2013.01); *E21B 43/16* (2013.01); *E21B 49/08* (2013.01); *E21B 49/087* (2013.01); *G01C 21/3852* (2020.08); *G01V 9/007* (2013.01); *G01V 9/02* (2013.01); *G06K 9/0063* (2013.01)

(58) Field of Classification Search
CPC . G01V 9/00; G01V 5/06; G01V 9/007; G01V 9/02; E21B 49/088; E21B 49/00; E21B 47/065; E21B 49/08; E21B 49/087; E21B 43/16; G01C 21/3852; G06K 9/0063

USPC .......... 382/109, 100; 702/12, 50; 175/14, 50
See application file for complete search history.

(56) References Cited

U.S. PATENT DOCUMENTS

| | | | |
|---|---|---|---|
| 5,596,494 A | 1/1997 | Kuo | |
| 5,987,388 A | 11/1999 | Crawford et al. | |
| 7,222,020 B2 | 5/2007 | Knight et al. | |
| 9,146,225 B2* | 9/2015 | Pottorf | G01N 29/14 |
| 10,132,144 B2* | 11/2018 | Lawson | C09K 8/582 |
| 10,145,974 B2* | 12/2018 | Hornbostel | G01V 1/38 |
| 2004/0049346 A1* | 3/2004 | Despax et al. | 702/12 |
| 2006/0047431 A1* | 3/2006 | Geiser | 702/12 |

(Continued)

OTHER PUBLICATIONS

Wenrich et al., "Recognition of Breccia Pipes in Northern Arizona, Arizona Bureau of Geology and Mineral Technology," Fieldnotes, vol. 18, No. 1, 1988, pp. 1-12.*

(Continued)

*Primary Examiner* — Shefali D Goradia
(74) *Attorney, Agent, or Firm* — Vobach IP Law, LLC

(57) ABSTRACT

In accordance with one embodiment, a method of locating mineral deposits suitable for production comprises obtaining via a computer an image of an area of land, determining from the image at least one fluid-expulsion structure present on the land, designating an area proximate the fluid-expulsion structure as a mineral exploration location; while in accordance with another embodiment a method of locating a hydrocarbon reservoir suitable for production is described which comprises obtaining via a computer an image of an area of land, determining from the image at least one fluid-expulsion structure present on the land, and designating an area proximate the fluid-expulsion structure as a hydrocarbon exploration location.

18 Claims, 19 Drawing Sheets

(56) References Cited

U.S. PATENT DOCUMENTS

2006/0061595 A1* 3/2006 Goede et al. ............... 345/619
2007/0255501 A1 11/2007 Kellogg

OTHER PUBLICATIONS

Braccini et al., "Sand Injectites." Summer 2008, pp. 34-49.*
Peters, "The use of Multispectral Satellite Imagery in the Exploration for Petroleum and Minerals," Phil. Trans. R. Soc. Lond., A 309, pp. 243-255, 1983.*
S.J.M. Molyneux et al., "Large Scale Deepwater Sediment Remobilisation: Examples From North Sea 3D Seismic and Outcrop, Rock the Foundation Convention," Jun. 18-22, 2001, Canadian Society of petroleum Geologists, pp. 1-11.*
Krewedi et al., "Uranium Mineralized Breccia Pipes in Northern Arizona," 1986, Arizona Geological Society Digest vol. XVI.*
H.E.Hawkes, "Principles of Geochemical Prospecting", Geological Survey Bulletin 1000-F, 1961, pp. 225-226 specifically.*
Boorman et al. "Fluid overpressure in layered intrusions: formation of a breccia pipe in the Eastern Bushveld Complex, Republic of South Africa", Sep. 6, 2002, Springer-Verlag, pp. 356-369.*
Recover, Simon R., "Breccia pipes—Fluid pathways of the opal gods." 4th National Opal Symposium, Lightning Ridge, extended abstracts. 2005, pp. 1-8.*
Gunn, P. J., and M. C. Dentith. "Magnetic responses associated with mineral deposits." AGSO Journal of Australian Geology and Geophysics 17 (1997): 145-158.*
Parize et al., A 3-D Model of Sand Injectite Network from Outcrop and Shallow High Resolution Seismic Data: The Rosans Clastic Sills and Dykes Field Example (Southern France), AAPG Annual Convention, Salt Lake City, Utah, May 11-14, 2003.
Wallace et al, "Late Paleozoic Tectonics and Hydrocarbon Systems of Western North America-The Greater Ancestral Rocky Mountains", AAPG Hedberg Conference, Jul. 21-26, 2002, Vail Colorado.
MatBal™ Software, Reservoir Analysis and Production Forecasting Software, 2008 Weatherford, pp. 1-6.
International Search Report and Written Opinion dated Mar. 31, 2010 for corresponding PCT Application No. PCT/US09/60018 filed Oct. 8, 2009.
Attrep, M., Quintana, L.R., and Cisneros, M.R., "Iridium in samples from the Ames structure", in, Johnson, K.S., and Campbell, J.A., eds.,*Ames structure in northwest Oklahoma and similar features-origin and petroleum production (1995 Symposium)*: Oklahoma Geological Survey, 1997, Circular 100, p. 375-378.
Baranoski, M.T., Schumacher, G.A., Watts, D.R. Carlton, R.W., and Ei-Saiti, B.M., "Subsurface geology of the Serpent Mound disturbance, Adams, Highland, and Pike Counties, Ohio", 2003, Ohio Division of Geological Survey Report of Investigations No. 146, p. 1-60.
Bartsch-Winkler, Susan, Dickerson, R.P., Barton, H.N., McCafferty, A.E., Grauch, V.J.S., Koyuncu, H., Lee, K., and Duval, J.S.-U.S. Geological Survey, and Munts, S.R.,Benjamin, D.A., Close, T.J., Lipton, D.A., Neumann, T.R., and Willett, S.-U.S.Bureau of Mines, "Mineral resources of the San Rafael Swell Wilderness Study Areas, Including Muddy Creek, Crack Canyon, San Rafael Reef, Mexican Mountain, and Sids Mountain Wilderness Study Areas, Emery County, Utah", 1990, U.S. Geological Survey Bulletin 1752, p. 1-56.
Baxter, J.W., Bradbury, J.C., Hester, N.C., Saxby, D.B., and Perry, B.L., "A geologic excursion to fluorspar mines in Hardin and Pope Counties, Illinois", 1973, Illinois State Geological Survey Guidebook Series 11, p. 1-28.
Billingsley, G.H., Wenrich, K.J., and Huntoon, P.W., "Breccia-pipe and geologic map of the southeastern part of the Hualapai Indian Reservation and vicinity, Arizona", 2000, U.S. Geological Survey Geologic Investigations Map I-2643.
Billingsley, G.H., Wenrich, K.J., Huntoon, P.W., and Young, R.A., "Breccia-pipe and geologic map of the southwestern part of the Hualapai Indian Reservation and vicinity, Arizona", 1999, U.S. Geological Survey Geologic Investigations Map I-2554.
Black, D.F.B., "Cryptoexplosive structure near Versailles, Kentucky", 1964, U.S. Geological Survey Professional Paper 501-B, p. 9-12.
Boon, J.D., and Albritton, C.C., Jr., "Established and supposed examples of meteoritic craters and structures", 1938, Field and Laboratory, v. 6, p. 44-56.
Bradbury, J.C., and Baxter, J.W., "Intrusive breccias at Hicks Dome, Hardin County, Illinois", 1992, Illinois State Geological Survey Circular 550, p. 1-23.
Brecke, E.A., "Ore genesis of the Cave-In-Rock fluorspar district, Hardin County, Illinois", 1962, Economic Geology, v. 57, n. 4, p. 499-535.
Breger, I.A., and Deul, M., "The organic geochemistry of uranium", 1956, in, Page, L.R., Stocking, H.E., and Smith H.B. eds., *Contributions to the geology of uranium and thorium by the United States Geological Survey and Atomic Energy Commission for the United Nations Conference on peaceful uses of atomic Energy, Geneva Switzerland*, 1955, U.S. Geological Survey Professional Paper 300, p. 505-510.
Brown, J.S., Emery, J.A., and Meyer, P.A., Jr., "Explosion pipe in test well on Hicks Dome, Hardin County, Illinois", 1954, Economic Geology, v. 49, n. 8, p. 891-902.
Bucher, W.H., "Uber kryptovulkanische Erscheinungen in Ohio and Kentucky", 1924,Ecolgae Geologie Helvetiae, v. 19, p. 141-143.
Bucher, W.H., "Cryptovolcanic structures in the United States", 1936, International Geological Congress, XVI Session, v. 2, p. 1055-1084.
Buchner, E., and Kenkmann, T., "Upheaval Dome, Utah, USA-Impact origin confirmed", 2008, Geology, v.36, n. 3, p. 227-230.
Carlson, E.H., "Minerals of Ohio", 1991, Ohio Geological Survey Bulletin 69, p. 24-30.
Cartwright, J., Huuse, M., and Alpin, A., "Seal bypass systems", 2007, American Association of Petroleum Geologists Bulletin, v. 91, n. 8., p. 1141-1166.
Chenoweth, W.L., "The Orphan Lode mine, Grand Canyon, Arizona—a case history of a mineralized, collapse-breccia pipe", 1986, U.S. Geological Survey Open-File Report 86-510, p. 1-6.
Chenoweth, W.L., "The production history and geology of the Hacks, Ridenour, Riverview, and Chapel breccia pipes, northwestern Arizona", 1988, U.S. Geological Survey Open-File Report 88-648, p. 1-60.
Cressman, E.R, "Surface geology of the Jeptha Knob cryptoexplosion structure, Shelby County, Kentucky", 1981, U.S. Geological Survey Professional Paper 151-B.
Dove A., and Lee, G., "Breccia-filled diatreme in Permian Illawarra Coal Measures and Triassic strata, Kandos, New South Wales", 1994, Journal and proceedings of the Royal Society of New South Wales, v. 127, p. 39-45.
Fay, R.O., "Copper deposits in Sheep Pen Sandstone (Triassic) in Cimarron County, Oklahoma and adjacent parts of Colorado and New Mexico", 1983, Oklahoma Geological Survey Circular 86.
Fiero, W.G., Jr., "Geology of Upheaval Dome, San Juan County, Utah", Nov. 1958, M.S. thesis, Laramie, University of Wyoming.
Finch, W.I, Sutphin, H.B., Pierson, C.T., McCammon, R.B., and Wenrich, K.J., "The 1987 estimate of undiscovered uranium endowment in solution-collapse breccia pipes in the Grand Canyon region of Northern Arizona and Adjacent Utah", 1990, U.S. Geological Survey Circular 1051, p. 1-19.
Hahn, G.A., and Thorson, J.P., "Geology of the Lisbon Valley sandstone-hosted, disseminated copper deposits, San Juan County, Utah", in Bon RL., Gloyn, R.W., and Park G.M., eds., *Mining districts in Utah*, Utah Geological Association Publication 32, p. 19-42.
Hargraves, R.B., Kellogg, K.S., Fiske, P.S., and Hougen, S.B., "Allochthonous impact-shocked rocks and superimposed deformations at the Beaverhead site in southwest Montana", in Dressler, B.O., Grieve, R.A.F., and Sharpton, V.L., eds., *Large meteorite impacts and planetary evolution:. Boulder, Colorado*, Geological Society of American Special Paper 293, 1994, p. 225-235.

(56) References Cited

OTHER PUBLICATIONS

Hawley, C.C., Wyant, D.G., and Brooks, D.B., "Geology and uranium. deposits of the Temple Mountain district, Emery County, Utah", 1965, U.S. Geological Survey Bulletin 1192.
Hawley, C.C., Robeck, R.C., and Dyer, H.B., "Geology, altered rocks, and ore deposits of the San Rafael Swell, Emery County, Utah", 1968, U.S. Geological Survey Bulletin 1239.
Heyl, A.V., and Brock, M.R., "Zinc Occurrence in the Serpent Mound Structure of Southern Ohio", 1962, U.S. Geological Survey Professional Paper 450-D, p. 95-97.
Hite, R.I., "An unusual northeast-trending fracture zone and its relation to basement wrench faulting in northern Paradox Basin, Utah and Colorado", 1975, Four Corners Geological Society, 8th Field Conference Guidebook, p. 217-223.
Huntoon, P.W., and Shoemaker, E.M., "Roberts Rift, Canyonlands, Utah—A Natural Hydraulic Fracture Caused by Comet or Asteroid Impact", 1995, Ground Water, v. 33, p. 561-569.
Hurst, A., and Cartwright, J., *Relevance of sand injectites to hydrocarbon exploration and production*, in Hurst, A., and Cartwright, J., eds., "Sand injectites—Implications for hydrocarbon exploration and production", 2007, American Association of Petroleum Geologists Memoir 87, p. 21-35.
Hyden, H.J., "Uranium and other trace metals in crude oils of the western United States", 1955, in Page, L.R., Stocking, H.E., and Smith H.B. eds., *Contributions to the geology of uranium and thorium by the United States Geological Survey and Atomic Energy Commission for the United Nations Conference on peaceful uses of atomic Energy, Geneva Switzerland*, 1955, U.S. Geological Survey Professional Paper 300, p. 511-519.
Jackson, M.P.A., Schultz-Ela, D.D., Hudec, M.R, Watson, LA., and Porter, M.L., "Structure and evolution of Upheaval Dome-A pinched-off salt diapir", 1998, Geological Society of America Bulletin, v. 110, n. 12, p. 1547-1573.
Johnson, H.S., Jr., "Uranium resources of the San Rafael District, Emery County, Utah—A regional Synthesis", 1957, U.S. Geological Survey Bulletin 1046-D, p. 37-54.
Kenkmann, T., Jahn, A., Scherler, D., and Ivanov, B.A., "Structure and formation of a central uplift—A case study at the Upheaval Dome impact crater, Utah", 2005, in Kenkmann, T., Horz, F., and Deutsch, A., eds., *Larger meteorite impacts III*, Geological Society of American Special Paper 384, p. 85-115.
Keys, W.S. and White, R.L., "Investigation of the Temple Mountain collapse and associated features, San Rafael Swell, Emery County, Utah", in Page, L.R., Stocking, H.E., and Smith, H.B., *Contributions to the geology of uranium and thorium by the United States Geological Survey and Atomic Energy Commission for the United Nations International Conference on Peaceful Uses of Atomic Energy, Geneva Switzerland*, 1955, U.S. Geological Survey Professional Paper 300, p. 285-298.
Kidwell, A.L., "Post-Devonian igneous activity in southeastern Missouri", 1947, Report of Investigations No. 4, p. 1-77.
Kopf, R W., "Hydrotectonics—Principles and relevance", Mar. 1982, U.S. Geological Survey Open-File Report 82-307.
Kriens, B.J., Shoemaker, E.M., and Herkenhoff, K.E., "Structure and kinematics of a complex impact crater, Upheaval Dome, Southeast Utah", 1997, Brigham Young University Geology Studies, v. 42, part 2, p. 19-31.
Locke, J., "Geological Report (on southwestern Ohio)", Dec. 1838, Ohio Division of Geological Survey Second Annual Report, Doc. No. 22, p. 201-286.
Mattox, RB., *Upheaval Dome, a possible salt-dome in the Paradox Basin, Utah*, in Mattox, R.B., ed., "Saline deposits", 1968, Geological Society of America Special Paper 88, p. 331-347.
McKnight, E.T., "Geology of the area between Green and Colorado Rivers, Grand and San Juan Counties, Utah", 1940, U.S. Geological Survey Bulletin 908, p. 1-146.
Novikov, L.A., and Slobodskoy, R.M., "Mechanism of formation of diatremes", 1978, International Geology Review, v. 21, n. 10, p. 1131-1139.

Nuccio, V.F., and Condon, S.M., "Burial and thermal history of the Paradox Basin, Utah and Colorado, and petroleum potential of the Middle Pennsylvanian Paradox Formation", 1996, U.S. Geological Survey Bulletin 2000-O, p. O1-O41.
Reidel, S.P., "Bedrock geology of the Serpent Mound cryptoexplosion structure, Adams, Highland, and Pike Counties, Ohio", 1975, Ohio Division of Geological Survey, Report of Investigations No. 95, scale 1:12,000.
Reidel, S.P., Koucky, F.L., and Stryker, J.R., "The Serpent Mound Disturbance, Southwestern Ohio", Nov. 1982, American Journal of Science, v. 282, p. 1343-1377.
Reidel, S.P., "Geology of the Serpent Mount Cryptoexplosion Structure", 1972, M. S. thesis, Cincinnati, Ohio, University of Cincinnati.
Reynolds, R.L., Goldhaber, M.B., and Snee, L.W., "Paleomagnetic and $^{40}AR/^{39}Ar$ Results from the Grant Intrusive Breccia and Comparison to the Permian Downeys Bluff Sill-Evidence for Permian Igneous Activity at Hicks Dome, Southern Illinois Basin", 1997, U.S. Geological Survey Bulletin 2094-G, p. 1-16.
Scheibner, E., "Geology of New South Wales-Synthesis", 1998, Geological Evolution, n. 13, v. 2, p. 251-271.
Seldon, B., and Flemings, P.B., "Reservoir pressure and seafloor venting: Predicting trap integrity in a Gulf of Mexico deepwater turbidite minibasin", Feb. 2005, American Association of Petroleum Geologists Bulletin, v. 89, n. 2, p. 193-209.
Shawe, D.R., "Sedimentary rock alteration in the Slick Rock district, San Miguel and Dolores Counties, Colorado", 1976, U.S. Geological Survey Professional Paper 576-D, p. D1-D51.
Shoemaker, E.M., and Herkenhoff, K.E., "Upheaval Dome Impact Structure", Mar. 12-16, 1984, Lunar and Planetary Science XV, Houston, 15*th* Lunar and Planetary Science Conference, Abstracts, part 2, p. 778-779.
Sutphin, H.B., and Wenrich, K.J.,"Map showing structural control of breccia pipes on the southern Marble Plateau, North-Central Arizona", 1988, U.S. Geological Survey Miscellaneous Investigations Map I-1778.
Wallace, C.A., "A method to use evolution of formation fluids and metal maturation windows to identify stratabound mineral exploration targets" Dec. 2000, unpublished report.
Wallace, C.A., Thorson, J.P., Wright, J.V., and Keller, J.W., "Metals and brines of the Paradox Basin, Colorado and Utah", AAPG Hedberg Conference, *Late Paleozoic Tectonics and Hydrocarbon Systems of Western North America—The Great Ancestral Rocky Mountains*, Jul. 21-26, 2002, Vail, Colorado.
Warren, J.K., "Evaporites-sediments, resources, and hydrocarbons", 2006, Springer, p. 553-555.
Weller, J.M., Grogan, R.M., and Tippie, F.E., "Geology of fluorspar deposits of Illinois", 1952, Illinois Geological Survey Bulletin 76.
Wenrich, K.J., "Mineralization of breccia pipes in northern Arizona", 1985, Economic Geology, v. 80, n. 6, p. 1722-1735.
Wenrich, K.J., Billingsley, G.H., and Van Gosen, B.S., "The potential of breccia pipes in the Mohawk Canyon area, Hualapai Indian Reservation, Arizona", 1992, U.S. Geological Survey Bulletin 1683, p. DI-D39.
Wenrich, K.J., Billingsley, G.H., and Huntoon, P.W., 1997, "Breccia-pipe and geologic map of the northeastern part of the Hualapai Indian Reservation and vicinity, Arizona", 1997, U.S. Geological Survey Miscellaneous Investigations Map I-2440.
Williams, P.L., "Geology, structure, and uranium deposits of the Moab quadrangle, Colorado and Utah", 1964, U.S. Geological Survey Miscellaneous Geologic Investigations Map I-360.
Williams, P.L., and Hackman, R.J., "Geology of the Saline quadrangle, Utah", 1971, U. S. Geological Survey Miscellaneous Investigations Map I-591-A.
Williams, P.L., and Hackman, R.J., "Structure and uranium deposits of the Salina quadrangle, Utah", 1971, U. S. Geological Survey Miscellaneous Investigations Map I-591B.
Willman, H.B., Atherton, E., Buschbach, T.C., Collinson, C., Frye, J.C., Hopkins, M.E., Lineback, J.A., and Simon, J.A., "Handbook of Illinois Stratigraphy", 1975, Illinois State Geological Survey, Bulletin 95, p. 61-63.

(56) References Cited

OTHER PUBLICATIONS

Witkind, I.J., "Geologic map of the Huntington 30' x 60' quadrangle, Carbon, Emery, Grand, and Uintah Counties, Utah", 1988, U.S. Geological Survey Miscellaneous Investigations Series Map I-1764.

Australian Government—IP Australia, Patent Examination Report No. 2, Patent Application 2009302298, dated Dec. 18, 2015, 4 pages.

Australian Government—IP Australia, Notice of Acceptance for Patent No. 2016203833 with copy of accepted claims, 6 pages, dated Sep. 3, 2018, Inventor: Chester A. Wallace.

Australian Government—IP Australia, Certificate of Grant for Patent No. 2009302298 with copy of accepted claims, 4 pages, Inventor: Chester A. Wallace.

Canadian Patent 2,734,707 granted on May 22, 2018 to inventor Chester A. Wallace.

\* cited by examiner

SYSTEM, METHOD AND APPARATUS FOR EXPLORATION

CROSS-REFERENCES TO RELATED APPLICATIONS

This application claims the benefit under 35 U.S.C. § 119(e) of provisional application Ser. No. 61/103,856, filed Oct. 8, 2008 for "SYSTEM, METHOD AND APPARATUS FOR MINERAL EXPLORATION" in its entirety and for all purposes.

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISK

Not applicable

BACKGROUND

Mineral and hydrocarbon exploration is a time consuming and expensive process. It can involve travel to remote areas and extensive governmental permitting processes and negotiation with private landowners. As a result, the targeting of prospective exploration sites is made carefully. Despite these careful attempts, exploration at targeted sites often results in failure. Either the resources discovered are insufficient for further development of the site to make economic sense or no resources are discovered at the site.

Given the vast resources of mining and hydrocarbon exploration companies, it is clear that those companies are currently using the best techniques that they currently know about to try and target new sites for mineral and/or hydrocarbon development. Despite those best efforts, however, those companies have not yet discovered the techniques claimed herein. Thus, the following disclosure is believed to set forth patentable embodiments.

SUMMARY

In accordance with one embodiment, a method of locating mineral deposits suitable for production is disclosed. The method comprises obtaining via a computer an image of an area of land; determining from the image at least one fluid-expulsion structure present on the land; and designating an area proximate the fluid-expulsion structure as a mineral exploration location.

In accordance with another embodiment, a method of locating a hydrocarbon reservoir suitable for production is disclosed. The method comprises obtaining via a computer an image of an area of land; determining from the image at least one fluid-expulsion structure present on the land; and designating an area proximate the fluid-expulsion structure as a hydrocarbon exploration location.

DETAILED DESCRIPTION

Overview

Figure 1:
FIG. 1 illustrates a map showing three areas in the U.S. that contain prominent fluids-expulsion structures
Figure 2A:
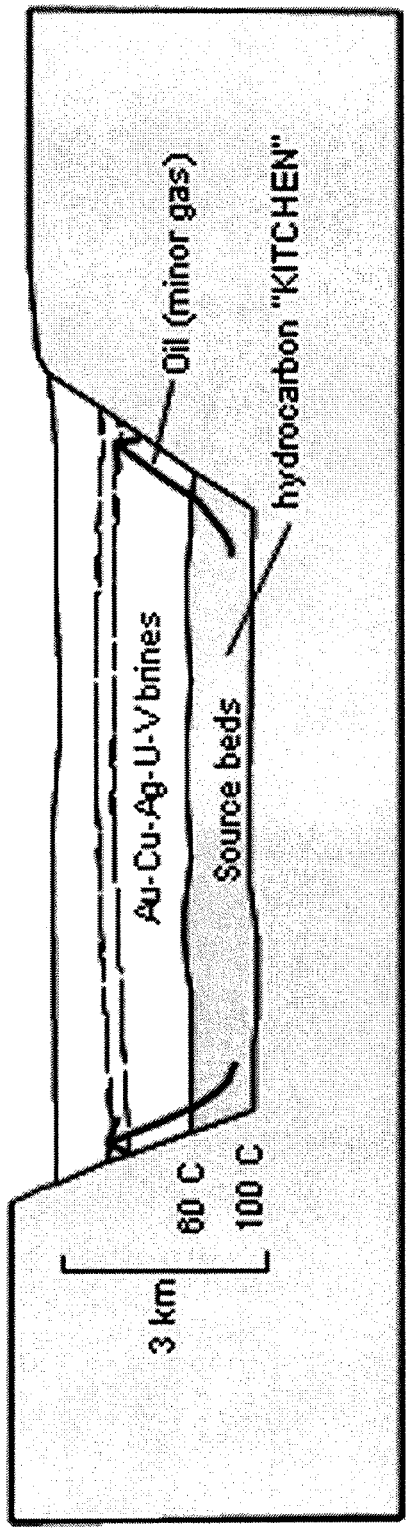
FIGS. 2A, 2B, 2C, and 2D illustrate a schematic rendition that show four examples of the role of tectonic control of sediment burial and metal transport in sedimentary basins.
Figure 2B:
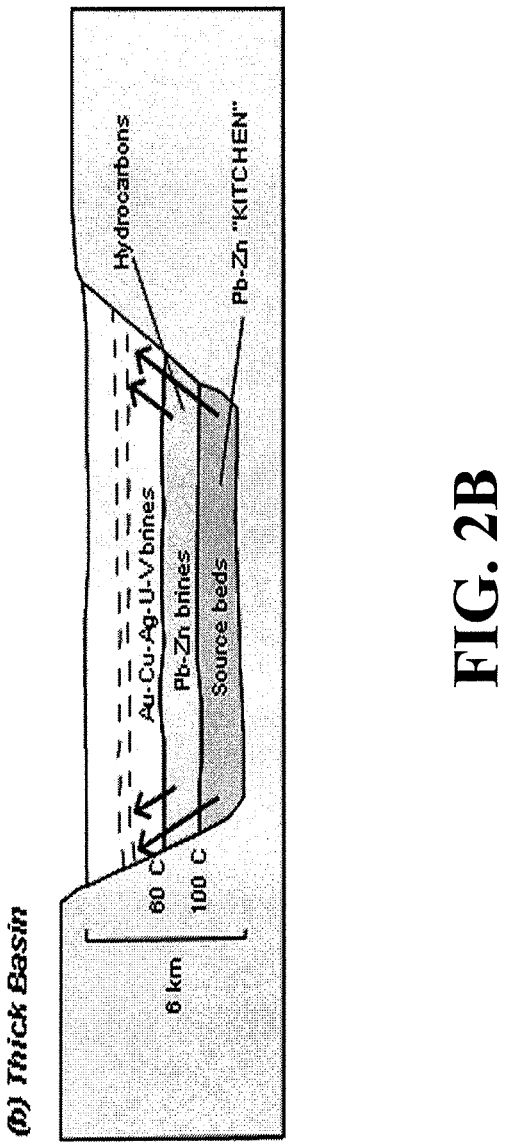
Figure 2C:
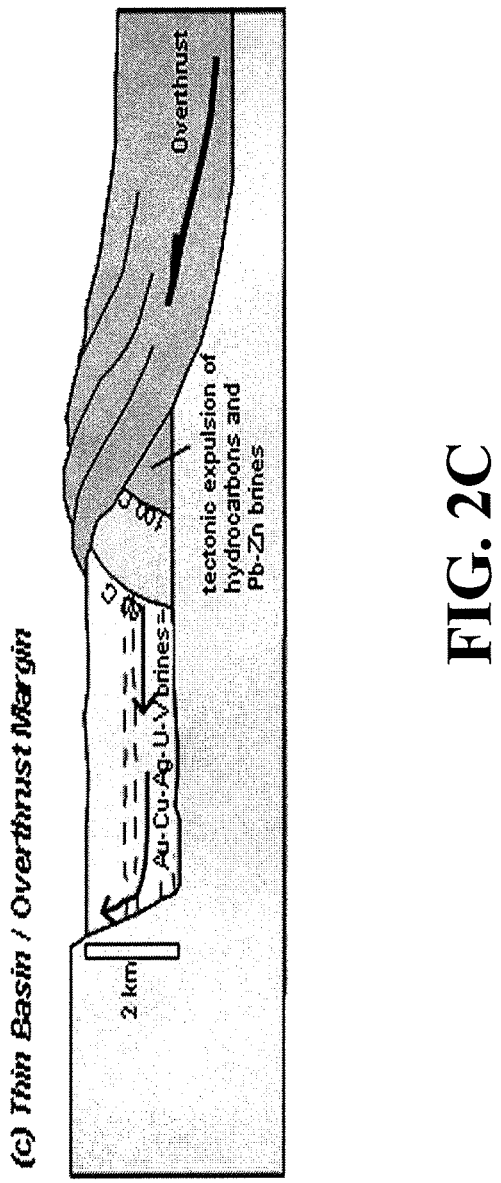
Figure 2D:
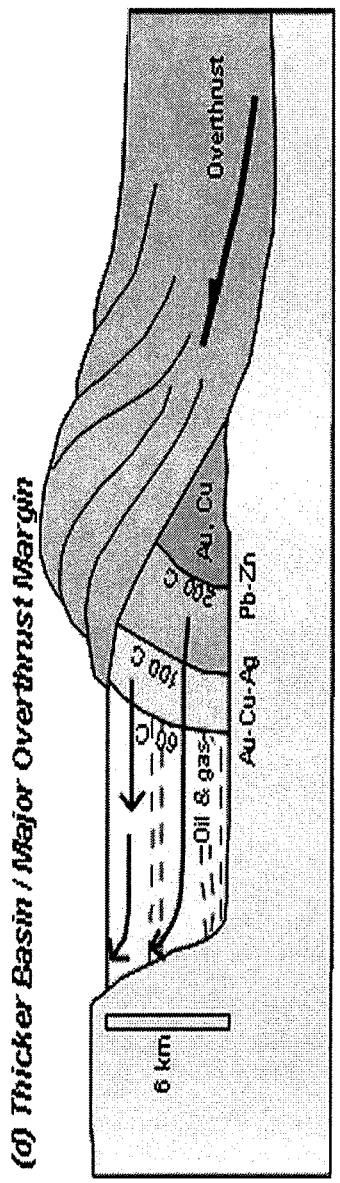

In accordance with one embodiment of the invention, the identification of ancient fluid-expulsion structures can be used to identify preferred locations for mineral deposits and/or hydrocarbon reservoirs. This report demonstrates that ancient fluid-expulsion structures are preferred locations for mineralized breccia, stratabound mineral deposits, and hydrocarbon reservoirs that can contain billions or trillions of dollars in metals or oil. Ancient fluid-expulsion structures represent important migration pathways for warm, metal-bearing, reduced, saline fluids and hydrocarbons in subsiding sedimentary basins. These features can be focal sites for reduction-oxidation chemical reactions that produce mineral deposits, making these structures highly prospective for stratabound mineral deposits. Where seals are preserved in these structures and in host strata, significant oil or gas accumulations may occur. Not all fluid-expulsion structures are mineralized or contain hydrocarbon reservoirs, but these structures are easy to find in ancient sedimentary basins using satellite images available to the public. These "faucets" were important controls of fluid-migration pathways in ancient sedimentary basins, and to date their role has not been understood by the mineral exploration industry nor by hydrocarbon explorers. The potential for these structures to contain large metal deposits has not been recognized by the mineral exploration industry, and most of the hydrocarbon exploration industry relates these structures to astroblemes and discounts the extraordinary resource potential. Sedimentary basins on the Earth that produced oil or gas have the potential to contain fluid-expulsion structures. The global distribution of fluid-expulsion structures in ancient sedimentary basins opens a vast new terrain to mineral and hydrocarbon exploration using very precise and simple methods to focus ground exploration efforts. The existence and importance of these structures has not been recognized by the mineral exploration industry nor by the hydrocarbon exploration industry. Nor has the potential for these structures to contain large metal deposits and hydrocarbon deposits been recognized.

Seismic profiles from subsea oil-producing basins show several types of brine and oil expulsion structures that are described in terms of disrupting seals on reservoirs. In subsea sedimentary basins, seal penetration in overpressured reservoirs produces breccia pipes and fluid-escape structures that are commonly cylindrical. Evaporite dissolution produces collapse breccia pipes through which brine and hydrocarbons can escape upward. In overpressured fluid systems, igneous sills can be disrupted and entrained in fluid-expulsion pipes, fluidized sand can be injected upward to break a reservoir seal, or overpressured fluids can "blowout" reservoir seals to inject fluidized sediment, brine, and hydrocarbons into overlying sediment. These fluid-expulsion structures can remain open to migrating brine, oil, and gas for tens of millions of years. Metal-bearing, warm, reduced, saline brine associated with migrating or trapped hydrocarbon can be injected upward through fluid-expulsion structures to cooler environments where oxidized sediment can chemically react with reduced fluid to form mineral deposits in pipes and in permeable strata invaded by reduced fluids. In addition, a ruptured seal can permit oil and gas to migrate upward through the break and enter permeable strata adjacent to the fluid-expulsion structure or form secondary reservoirs within the porous pipe if seals exist.

During subsidence of a sedimentary basin, temperatures increase, formation water becomes more saline, organic compounds begin to form, and metals leach from metal-bearing sediment into the warm brine. Metals leach into brines in a specific order determined by the thermodynamic behavior of metal ions. The concept of metal-maturity windows summarizes the sequence and temperatures of metal leaching. Low-temperature fluids contain more uranium, vanadium, copper, silver, gold and platinum group metals than do higher temperature formation fluids, which are rich in lead and zinc. The temperature range in which most metals leach into brine is similar to temperature ranges that change kerogen into oil and gas. Low-temperature metamorphic fluids expelled from sedimentary basins contain high concentrations of gold, copper, and cobalt, but temperatures in this range crack hydrocarbons.

Three examples illustrate the importance of fluid-expulsion structures in forming mineral deposits: (1) Northwestern Arizona which is dominated by karst-breccia fluid-expulsion structures rich in uranium, vanadium, and copper; (2) San Rafael Swell where sand injectites provided avenues for warm, reducing, saline brine and hydrocarbons under high pressure that deposited uranium, vanadium, and copper; and (3) Mid-Continent of the U.S. where large diameter fluid-expulsion structures were part of the base-metal sulfide mineralization system.

In northwestern Arizona, in the vicinity of the Grand Canyon, more than 1,000 small diameter breccia pipes have been identified, and these pipes occur in clusters. Not all pipes are mineralized, but some pipes that are mineralized contain significant resources of uranium, vanadium, copper, and silver. Although most mineral deposits occur in breccia pipes, rich stratabound deposits have produced millions of pounds of U3O8 from permeable strata adjacent to the pipes. Common trace elements are chromium, molybdenum, lead, zinc, strontium, and antimony, and some can be present is substantial concentrations. Asphalt is common in traces in these pipes, so some oil was in the brine. About 18 mines have produced uranium, vanadium, and copper as the main metals in northwestern Arizona. The estimated mean value for undiscovered uranium is 1,300,000 tons of U3O8 over 16,728 sq mi in the Grand Canyon region.

On the San Rafael Swell in east-central Utah, three widely separated clusters of "collapse" pipes contain high concentrations of uranium and copper. These pipes are sand injectites that form breccia, and the injectites penetrated more than 1,600 ft (about 490 m) before host sand, silt, and mud were completely lithified. The injected sand and breccia provided an upward fluid pathway for metal-bearing, reduced, warm brine that deposited uranium, vanadium, and copper, and minor oil in the sand injectites and in permeable strata of the Moenkopi and Chinle Formations where stratabound mineral deposits formed. About 7,000,000 lbs (3,500 tons) of uranium was produced by mines on the San Rafael Swell, but this amount of uranium may represent only a small fraction of the original metal contained in stratabound ore deposits because erosion eliminated much of the rock that may have contained uranium, vanadium, and copper. Although uranium and vanadium have been the primary focus of exploration and production on the San Rafael Swell, these deposits are multi-metal stratabound occurrences, and copper, gold, and platinum group metals add value to ore.

In the Mid-Continent region, fluid-expulsion dikes and pipes occur in clusters, and some structures are several miles in diameter. Hicks Dome, in southern Illinois, is an anticlinal feature that is intruded by breccia dikes that contain igneous rocks and limestone in a sandy matrix. Hicks Dome and the nearby Cave-In-Rock mining district produce fluorspar, galena, and sphalerite ore from breccia dikes and from stratabound deposits adjacent to breccia dikes. Although no circular features occur at Hicks Dome, four prominent circular features occur 15 ml (about 24 km) to the west. Serpent Mound, in southwestern Ohio, is about 5 ml (about 8 km) in diameter, and this structure has an uplifted central plug, a prominent moat, and an uplifted rim. Breccia is prominent in the plug and rim, and this structure has been considered an impact structure in recent studies, but further analysis suggests that it is a fluid-expulsion structure. Breccia is mineralized by sphalerite. Stratabound sphalerite deposits occur along bedding planes. This structure is probably related to Mississippi Valley-type lead and zinc deposits in this region. Serpent Mound is one of four probable fluid-expulsion structures that occur in a cluster within an area of 125 sq mi (about 327 sq km) in a north-south oriented mineralized zone.

New clusters of probable fluid-expulsion structures have been identified by examining satellite images in the Mid-Continent region. Near a described circular structure at Versailles, Ky., two other circular features occur. Between Versailles and Jeptha Knob, Ky., a large circular feature has been identified at Harrisonville, Ky. Muldraugh Dome is a described circular feature in northern Kentucky, and two other features occur south of the Dome. Approximately 15 ml (about 24 km) northwest from Muldraugh Dome are three circular features cut by the Ohio River near Maukport, Ind., and these features range from 1.5 to 2.5 ml (about 2.5 to 4 km) in diameter, and nearby a fourth, smaller circular feature is only 0.9 ml (about 1.5 km) in diameter. These potential fluid-expulsion structures are probably related to regional brine and hydrocarbon migration from the Appalachian Basin located to the east. None of the newly identified structures are likely to have been explored for stratabound mineral deposits, and possible relations to hydrocarbon reservoirs are not likely to have been evaluated.

Although the focus of this explication is mainly applied to locating prospective sites for stratabound mineral deposits, a corollary proposition is that these structures are also potential hydrocarbon traps. Fluid-expulsion structures may trap hydrocarbons where seals occur above porous breccia and in stratigraphic traps adjacent to breccia pipes in permeable host strata. A brief evaluation of potential fluid-expulsion structures that contain hydrocarbons indicates that estimated reserves of oil trapped in and adjacent to expulsion structures are 50 MMBO at the Ames structure in Oklahoma, 10 MMBO at Red Wing Creek in North Dakota, 600 MMBO at Cass Co. Michigan, and 700 MMBO at the Lima structure in Michigan. Most of these structures have been misidentified as meteorite impact features. Exploration for new fluid-expulsion structures near known hydrocarbon-producing structures could be accomplished at low cost because secondary traps are generally shallow.

Several options are available to support exploration for stratabound mineral deposits and for oil or gas reservoirs. For stratabound mineral exploration two options that could be integrated into exploration programs are: (1) Conduct a methodical, global examination of all land-based, oil-producing basins where a company has on-going mining operations, exploration licenses, or claim blocks to locate possible fluid-expulsion structures that may contain stratabound mineral deposits or mineralized breccia pipes; (2) Examine all land-based, oil-producing basins to evaluate the volume of hydrocarbon productivity (Total Petroleum System Analysis), with the presumption that basins with the greatest volume of oil also generated the largest volume of metal-bearing brine. Basins that produced the most oil have the best prospectivity to have generated numerous fluid-expulsion structures and attendant stratabound mineral deposits. A third option for stratabound mineral exploration would be to conduct a methodical, global examination of oil-producing basins without regard to amount of oil production to compensate for basins that have potential high oil-productivity, but that have been recently discovered. A fourth option for stratabound mineral exploration involves training staff to employ the concepts to which the company has purchased access. Exploration for oil and gas using these concepts also has several options: (1) Conduct a methodical, global examination of land-based sedimentary basins to locate possible fluid-expulsion structures that may contain oil or that may have peripheral reservoirs; (2) The presumption of a link between the volume of oil produced in a basin and the number of potential fluid-expulsion structures and attendant hydrocarbon reservoirs appears valid for oil and gas exploration as well, so those basins with the greatest production should be investigated first; (3) Determine the time of hydrocarbon generation and migration directions to establish progression of fluids through aquifers, which can be used to establish which fluid-expulsion structures are most likely to contain hydrocarbons; and (3) A training option for company staff to employ these concepts for hydrocarbon exploration is possible.

Fluid-Expulsion Structures

Fluid-expulsion structures have a global importance to mineral and oil exploration because stratabound mineral deposits are closely linked to these structures, and these "faucets" represent fundamental controls over brine and oil migration in ancient sedimentary basins. The importance of fluid-expulsion structures in exploration for stratabound mineral deposits has not been recognized by the mineral exploration industry; the genetic link to fluid-migration pathways is not understood by the exploration industry, and in the past, these structures have been misidentified and misinterpreted.

Expulsion of brine and oil from confined aquifers or through seals in oil reservoirs profoundly alters fluid migration by reducing dynamic fluid pressure, which can stop migration entirely. Alternatively, oil can be trapped in fluid-expulsion structures or in permeable rocks adjacent to the expulsion structure. Fluid-expulsion structures have been misidentified as "collapse" pipes, "cryptovolcanic" and "cryptoexplosive" structures, astroblemes, meteorite impact structures, and karst breccias. Misidentification of fluid-expulsion structures masked the true role of these structures in migration of metal-bearing, basinal fluids and hydrocarbons. This new frontier in exploration is two-fold: (1) Fluid-expulsion structures can indicate the location of potential stratabound mineral deposits; and, (2) Fluid-expulsion structures can trap migrating oil, or the pressure release can terminate oil migration. Fluid-expulsion structures occur in most sedimentary basins that produced hydrocarbons. The link between fluid migration and expulsion structures is not part of the knowledge of the mineral exploration industry, and oil companies focus mainly on detecting seal ruptures in reservoirs rather than using ancient fluid-expulsion structures as keys to the dynamic behavior of fluids in ancient sedimentary basins.

Ancient fluid-expulsion structures can be identified in the geologic record. These features controlled distribution of stratabound mineral deposits and affected the dynamic behavior of migrating brine and oil. These structures are widely distributed in Phanerozoic oil-producing basins, but these structures are localized in clusters leaving large areas of sedimentary basins devoid of fluid-expulsion features.

A corollary to the relationship between fluid-expulsion structures and stratabound mineral deposits is that fluid-expulsion structures exert fundamental control on hydrocarbon migration, and identification of these structures is an important tool to understand where hydrocarbon reservoirs are not likely to occur, as well as to identify places where secondary reservoirs were created.

With regard to stratabound mineral deposits, a snapshot of three areas (FIG. 1) in the U.S. where fluid-expulsion structures are related to stratabound mineral occurrences can be seen. Many of these were mines. These examples illustrate the extraordinary global exploration opportunity presented by the concepts described herein. The three regions addressed as examples are: (1) Northwestern Arizona in the Grand Canyon region, also known as the Arizona Strip; (2) The San Rafael Swell in east-central Utah; and, (3) Mid-Continent region where southern Illinois, Indiana, Ohio, and western Kentucky adjoin. These areas were selected because rocks and structures have been described adequately in the literature, and because each region shows important variations in composition and physical characteristics of fluid-expulsion structures. All of these fluid-expulsion features described in these snapshots contain hydrocarbons (asphalt) in breccia or in cavities, which indicates that the brine contained liquid petroleum. Fluid-expulsion structures in each of these areas contain mineral deposits in breccia or in stratabound hosts adjacent to fluid-expulsion structures or dikes. The mineral deposits vary greatly in contained metals, but the most common metals are uranium, vanadium, copper, silver, gold, platinum group metals, lead, zinc, and cobalt. Mines in northwestern Arizona have produced uranium and vanadium, but copper, silver, gold, lead, and zinc have also been mined. The San Rafael Swell has produced substantial uranium and vanadium, and strata may host multi-metal deposits that include copper, silver, gold, and platinum-group metals. In the Mid-Continent region, fluorspar ore was a main product of mines in the Hicks Dome area and in the Cave-In-Rock mining district in southeastern Illinois, but galena and sphalerite enhanced the value of the ore. A circular brecciated structure in southern Ohio, named Serpent Mound, contains sphalerite, barite, chalcopyrite, marcasite, and pyrite in a dolomite breccia. The resource has not been exploited because it was judged too low in grade by Cominco, based on three shallow drill holes.

These concepts can be applied to hydrocarbon exploration, so a brief explanation is offered regarding relations between fluid-expulsion structures and oil and gas exploration. There is a systemic couple between formation of metal-bearing brine and hydrocarbons because brine and hydrocarbons originate from the same source rocks and share the same temperature ranges in subsiding sedimentary basins. Of the numerous probable fluid-expulsion structures that contain oil and gas, the Ames structure in Oklahoma was chosen because it contains productive oil fields, and it has been misidentified as an impact structure. Many other probable fluid-expulsion structures have been misidentified as impact structures so reevaluation of the origin of the Red Wing and Newporte fields in North Dakota, Cass County and Warren in Michigan, and the Lima field in Indiana is in order. Reserves in these fields range between 10 and 700 MMBO. Although not all of these oil fields will eventually be proved to be fluid-expulsion structures, most are likely to be related to upward brine and oil expulsion through seal ruptures in confined aquifers or hydrocarbon reservoirs, which is not destructive to hydrocarbons as are meteorite impacts.

FIG. 1 is an Index map showing three areas in the U.S. that contain prominent fluids-expulsion structures. 1. Northwestern Arizona in the Grand Canyon region. 2. San Rafael Swell in east-central Utah. 3. Mid-Continent area in the vicinity of Serpent Mound, Ohio.

Application of this site discovery technique to stratabound mineral exploration programs will give a strong advantage over competitors in pursuit of shallow, large, stratabound mineral deposits that commonly contain uranium-vanadium, copper-silver, gold-platinum group metals, lead, or zinc. Many of these stratabound mineral deposits are multi-metal deposits that contain valuable trace elements. The global scale to which this concept can be applied derives from the association of oil-producing basins with stratabound mineral deposits. All sedimentary basins that contain hydrocarbon reservoirs had brine-, oil-, and gas-migration pathways through which fluids moved from organic, metal-bearing source beds to containment reservoirs or to aquifers and fluid-expulsion structures. Without an exit into permeable beds or into subsea vents (the "faucet"), fluids contained in pore spaces in sedimentary rocks cannot migrate. Therefore, identification of ancient fluid-expulsion structures provides a quick and inexpensive way to identify likely locations at which warm, reduced brines chemically reacted with lower temperature, oxidized formation fluid to produce stratabound mineral deposits.

Use of this concept in hydrocarbon exploration will provide a competitive advantage to any company by using satellite images to locate the most highly prospective areas in a sedimentary basin that could have formed reservoirs in highly permeable breccia, or to locate the "faucet" that may have been instrumental in stopping oil or gas migration in structural compartments. Use of this concept to understand the dynamics of hydrocarbon migration and entrapment is global in scope. Two types of traps are common in fluid-expulsion structures: (1) Cap-rock over porous, hydrocarbon-filled breccia; and, (2) Stratigraphic traps adjacent to the expulsion structure in which hydrocarbons invaded permeable aquifers below seals.

In subsiding sedimentary basins, metal-bearing, carbonaceous shale and siltstone descend into increasingly higher temperature regimes during which water is expelled from fine-grained clastic and carbonate sediment as part of the lithification process. Diagenetic changes in the sediment reflect changes in the chemical composition of pore water, increased temperature, and dewatering of clay minerals. In general, salinity increases with increasing burial depth, which increases chlorine concentration to permit inorganic, metallic coordination compounds to form as metals leach into the chemically reduced brine. Because organic compounds mature with increasing burial, metal-bearing, warm, saline brines are closely associated with oil and gas generation. Organic coordination compounds begin to form early in the burial sequence at temperatures as low as 25° C. Carboxylic and naphthenic acids, porphyrins, and asphaltenes combine with metals in chemically reduced brine and transport the metals in the brine plume. Dissolution of evaporites in the stratigraphic sequence can greatly increase salinity of the pore fluid above the normal salinity increase caused by membrane filtering, and higher concentrations of chlorine in brine increases the concentration of metal-chloride coordination compounds. Metals are leached from organic-rich source rocks into the warm, acidic brine in an orderly progression determined by the thermochemical properties of metals in different valence states, and this progression is summarized by metal-maturity windows. These organic-rich source rocks begin to produce gas and oil under increasing temperature and dynamic pressure, and metal-bearing brine enters permeable rock units before gas and oil enters the same permeable rock units. Metals that enter the brine at lower temperatures and lower salinity migrate with the first brines into aquifers, whereas metals that enter the brine at high temperatures and high salinity in the "hydrocarbon kitchen" are the last metals to migrate with oil. The last dewatering event is expulsion of "metamorphic water" from the source rock, which is the highest temperature metal-leaching event that affects only the deeply buried parts of the basin. The orderly progression of metal leaching from the source rock yields a conveyor belt of different metals carried in moving brine and, ultimately, leads to partitioning of metals in sedimentary basins.

Tectonic Settings of Basins

On the scale of a sedimentary basin, the tectonic setting is a determining factor of eventual burial depth, and the final burial depth influences the sequence of metals released into chemically reduced brine (FIG. 2). Heat and dynamic pressure force brines, oil, and gas to migrate into permeable strata within the basin, migrate to permeable transfer zones such as faults, or break confining seals in brine and hydrocarbon reservoirs. Generally, brine and hydrocarbons are expelled up-dip toward basin edges. A basin that is not buried deeply may not generate enough heat during burial to leach a complete range of metals from source rocks or to produce mature hydrocarbons, so some basins may have generated and precipitated metals from low-temperature maturity windows and biogenic gas probably would have been the principal hydrocarbon. Other basins, such as basins with overthrust margins, may bury sediment deeply, and high temperatures of deep burial can promote leaching of a wide range of metals into the acid, reduced, warm brine, as well as creating mature hydrocarbons. Extreme dynamic pressure can force brines to break reservoir seals, which will move metals to places of chemical and thermal disequilibrium where stratabound mineral deposits are precipitated, and permit oil to migrate into upper levels of the sediment stack through expulsion breccias.

FIG. 2 is a schematic rendition that shows four examples of the role of tectonic control of sediment burial and metal transport in sedimentary basins. A—Shallow burial of a relatively thin sedimentary sequence leached Au, Cu, Ag, U, and V from source rocks. B—Deeper burial of source rocks produced the characteristic leaching sequence of U, V, Cu, Ag, and Au at lower temperatures and Pb and Zn at temperatures of oil generation. C—A thin sedimentary sequence buried by overthrusts first releases low-temperature metals from source rocks and Pb and Zn are leached at oil generation temperatures. A strong directional component to dynamic pressure and brine migration direction characterizes this scenario. D—A thick sedimentary sequence buried by overthrusts releases the typical sequence of metals from source rocks, and metamorphic water carrying Au and Cu is expelled from most deeply buried sediment. A strong directional component to dynamic pressure and brine-migration direction characterizes this scenario.

Metal-Maturity Windows

The concept of metal-maturity windows is based on prograde thermal maturation of source rocks during progressive burial, and this concept can be used to predict the principal metal associations in stratabound mineral deposits. The sequence of metal leaching from a source rock into saline, reduced brine is predictable. Metals leach from source sediment, most commonly black shale, in a specific sequence determined by physical and chemical characteristics of the sediment and brine, and by thermochemical behavior of elements and coordination compounds. Metals form coordination compounds in a predictable sequence during increasing temperature, and this sequence is summarized by "metal-maturity windows". The five "metal-maturity" windows are a preliminary summary of probable temperature ranges at which maximum leaching and maximum degree of association of coordination compounds is expected. Metal-maturity windows integrate published temperature and composition data of fluid inclusions from mineral deposits, mineral-stability conditions, and calculations of thermodynamic maximum degree of association for inorganic coordination compounds. Interpretation of fluid-inclusion data does not account for higher temperatures recorded by fluid inclusions that result from universal exothermal chemical reactions of metallic mineral precipitation. The temperature ranges for the windows are approximate. Each window is identified by the most common metals that dissolve into the reduced brine in a particular temperature range, but other metals, such as Co, Ni, La, Cr, Mo, and rare earth elements can be substantial metallic components of some windows.

| Metal-Maturity Windows | |
|---|---|
| U—V—(Th) Window: | 35° C. to 100° C. |
| Au—Pt—Pd Window: | 60° C. to 110° C. |
| Cu—Ag—(Ba) Window: | 60° C. to 120° C. |
| Pb—Zn—Ba Window: | 70° C. to 180° C. |
| Au—Co—Cu Window: | 175° C. to 275° C. |

Figure 3:
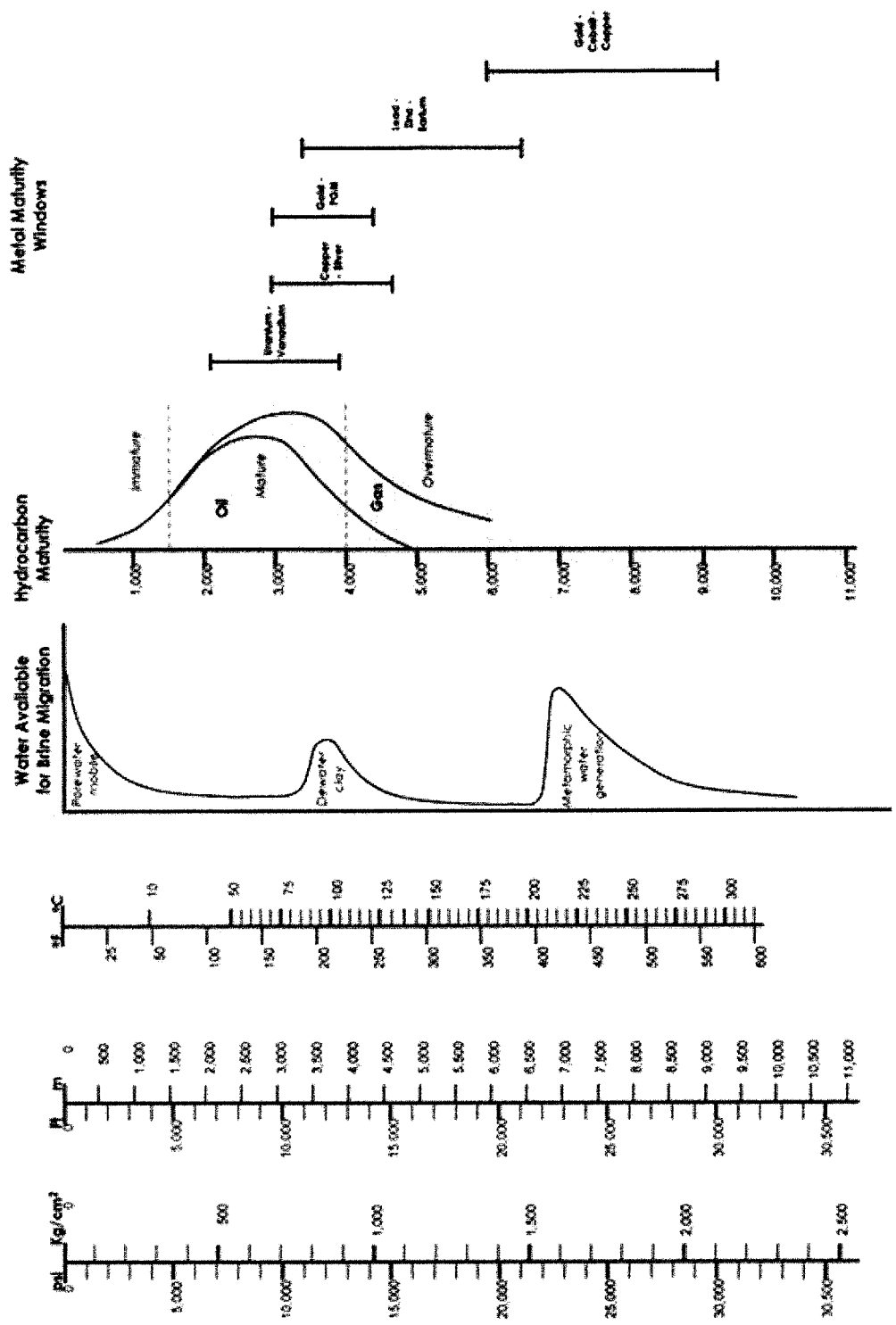
FIG. 3 illustrates general relations among burial depth of sediment, temperature increase during progressive burial, pressure increase during continuing burial, dewatering periods caused by increasing pressure and temperature, hydrocarbon maturity, and metal-maturity windows.

In every subsiding sedimentary basin, the interactions among burial depth, temperature increase, dewatering of sediment, hydrocarbon maturity, metal-maturity windows, brine expulsion and migration, and metallic-mineral precipitation are universal (FIG. 3). The physical and chemical principles that interact during subsidence of a basin produce similar predictable results that can be modeled to reconstruct fluid-flow pathways and estimate locations that are most likely to contain specific types of metallic mineral deposits. The principal variable among different basins is the metallic composition of source rocks in the subsiding basin, which determines which metals are deposited eventually at chemical oxidation-and-reduction reaction (redox) sites. The evolving brine changes metal composition over millions of years. The earliest portion of the metal-bearing brine at the lowest temperature metal-maturity window will be forced by heat and pressure from the original site of metal dissolution. The brine is, in effect, a moving conveyor belt of different brine compositions and metal components, and this conveyor belt can be tapped at any weakness in host aquitards to force brine upward to shallow depths where thermal and chemical disequilibrium precipitate metallic minerals. The brines at the lowest temperature and lower salinities may extend farthest from the source rock in the "hydrocarbon kitchen", and these brines may be able to exploit the first weaknesses in seals of evolving oil and gas reservoirs. The types of weaknesses that can be exploited in evolving reservoirs are faults, fracture systems at anticlinal crests, injected sand bodies, mud diapirs, salt diapirs, or gas chimneys. These vents can expel metal-bearing brine, oil, gas, and commonly a mixture of all three from deeper parts of the sedimentary basin into shallow sediment. Venting of brine and oil may result in reduction of dynamic pressure, which may stop oil and brine migration.

The combination of metal-maturity windows with migration patterns of brine and oil in a sedimentary basin aids predictions about where stratabound mineral deposits might occur, the metal associations that might result, and potential locations of secondary oil and gas reservoirs.

Hydrocarbon Maturity

Generation of hydrocarbons and leaching of metals into warm, saline brine occur through the same temperature range, and metal-bearing brine and oil are closely linked. Organic carbon is the most concentrated in deep-marine sediment deposited between 2,000 and 6,000 ft (about 610 and 1,830 m) and lesser amounts of organic carbon occur in brackish and shallow, continental-shelf environments. Rocks classed as "good source rocks" commonly have between 1% and 10% organic carbon, most of which is contained in "kerogen", which is a complex polymeric mixture. In subsiding sedimentary basins dominated by marine sediment, biogenic gas forms in the upper 3000 ft (about 920 m) in at temperatures less than about 60° C. Between about 60° C. and 150° C., heat splits chemical bonds of organic matter to form Type I or Type II kerogen, and liquid petroleum and thermogenic gas are generated in the "oil window". Mature hydrocarbons are generated in the same temperature range in which metals are leached from the source rocks that generated oil (FIG. 3). Not only is chlorine available to form coordination compounds, but organic acids, light paraffins, asphaltenes, and porphyrins, are available to form organic coordination compounds that bond with leached metals. Insolubility of brine and petroleum fractionates the two fluids. Viscosity differences and differences in molecular radii between brine and hydrocarbons may permit the metal-bearing brine to migrate from source rocks before liquid petroleum leaves the source rock, when dynamic pressure from tectonic activity and differential thermal diffusion force fluids from the source rock. Invasion of liquid petroleum into aquifers probably follows the initial migration of metal-bearing brine into aquifers. Anticlinal, fault, and stratigraphic traps can confine both fluids. Although brines may be able to exploit the first weaknesses in reservoir seals, oil may follow brine into new traps high in the fluid-expulsion structure. Faults, fracture systems at anticlinal crests, injected sand bodies, mud diapirs, salt diapirs, and gas chimneys form the "faucets" that allow metal-bearing brine, oil, gas, and commonly a mixture of all three, to migrate upward into shallow secondary traps from deep in the sedimentary basin.

In FIG. 3, general relations are shown among burial depth of sediment, temperature increase during progressive burial, pressure increase during continuing burial, dewatering periods caused by increasing pressure and temperature, hydrocarbon maturity, and metal-maturity windows. Metal-maturity windows are based on temperature stability ranges of coordination compounds and fluid-inclusion data that records temperature of crystallization of metallic compounds. Hydrocarbon generation is closely related to dissolution of metals into reduced, warm brine. Expulsion of metal-bearing brine and hydrocarbons from sedimentary basins are different phases of the same thermal system.

Subsea Fluid-Expulsion Structures

Modern counterparts of ancient fluid-expulsion structures are recorded on seismic profiles from hydrocarbon producing, subsea basins. Hydrocarbons and brine plumes that are under high dynamic pressure can exploit weaknesses in reservoir seals, such as faults and fractures, or can intrude permeable sand injectites that break upward through young sediment layers. Pore-fluid pressure in the Popeye-Genesis mini-basin (Gulf of Mexico) hydraulically fractured overlying shale seals, which allowed upward fluid migration; fluids vented to the seafloor to form mud volcanoes where gas hydrates formed. Recently, a study of "seal-bypass systems" by Cartwright and others (2007) has focused on seismic criteria to identify mechanisms by which hydrocarbons bypass and breach reservoirs. Seal bypass systems consist of fault bypass, intrusive bypass (igneous intrusions, sand intrusions, and mud diapirs and diatremes, and salt diapirs), and pipe bypass (dissolution pipes, hydrothermal pipes, blowout pipes, and seepage pipes). Although analysis of these bypass systems by Cartwright and others focused on hydrocarbon migration, saline, metal-bearing brines are part of the same migration systems as hydrocarbons.

Intrusive-bypass systems are caused by sandstone intrusions, igneous intrusions, mud diapirs, and diatremes. Sandstone intrusions result from high fluid pressures in the basin. Sand injection occurs as a fluidized mass that has flow velocities on the order of 1 to 2 cm/s$^{-1}$. In the United Kingdom Atlantic margin petroleum province, sand injectites have penetrated vertically 3,300 ft (1,000 m) above the parent sand body across competent sealing sequences. Sandstone intrusions (FIG. 4) can remain as highly permeable pipes for many millions of years until pore space is occluded or until the high fluid pressure is dissipated. Pore-space occlusion may occur by diagenetic processes that include precipitation of metallic minerals in the pipe or as replacement stratabound deposits in permeable beds that border the pipe. When high fluid pressure is dissipated neither brine nor oil can migrate. Igneous intrusions can cause intense brecciation of host rock and the intrusive body (FIG. 5). Fractures at the metamorphic contact can provide long-term conduits, which may fill with metallic minerals in veins. Injection of magma into wet, non-consolidated sediment can greatly alter the metallic signature of minerals precipitated in pipes or as stratabound deposits; an ultramafic magma would produce different metallic minerals and trace metals than a rhyolitic magma. Mud diapirs and diatremes form when fine-grained, clay-rich sediment liquefies and fails; upward injection is likely to be episodic. Upward migration of fluids is episodic as well, and flow volumes are small. Therefore, mud diapirs and diatremes are not likely to be centers of large-scale mineralization. Salt diapirs commonly fold and deform non-consolidated sediment and deformation can severely modify fluid-migration regimes and seal integrity. Fluid leakage near salt diapirs occurs by complex fracture networks developed near the contact between salt and host sediment. Fault and fracture systems adjacent to salt diapirs are open for short periods, and are not likely to vent large volumes of brine or hydrocarbons.

Figure 4:
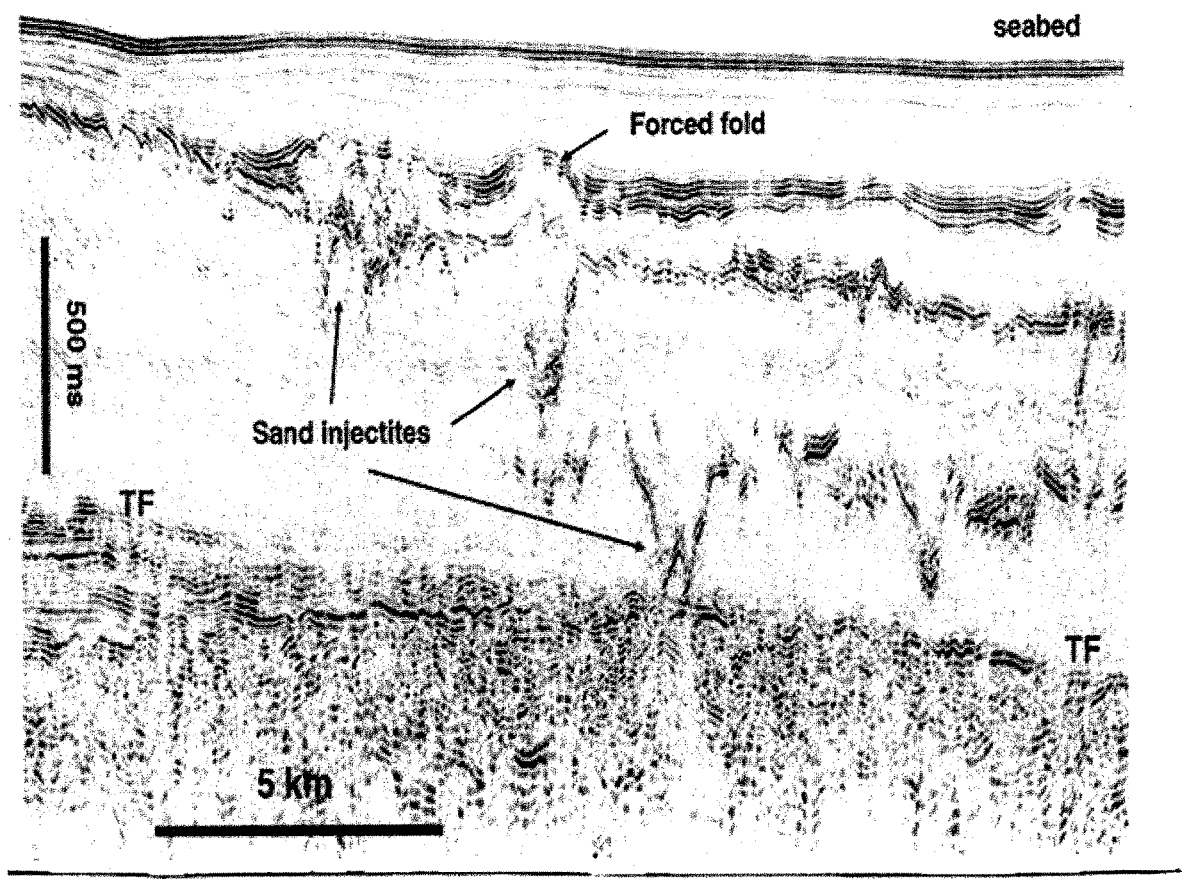
FIG. 4 illustrates a seismic profile of large-scale, interconnected sand injectites, offshore United Kingdom, in the Faeroe-Shetland Basin.
Figure 5:
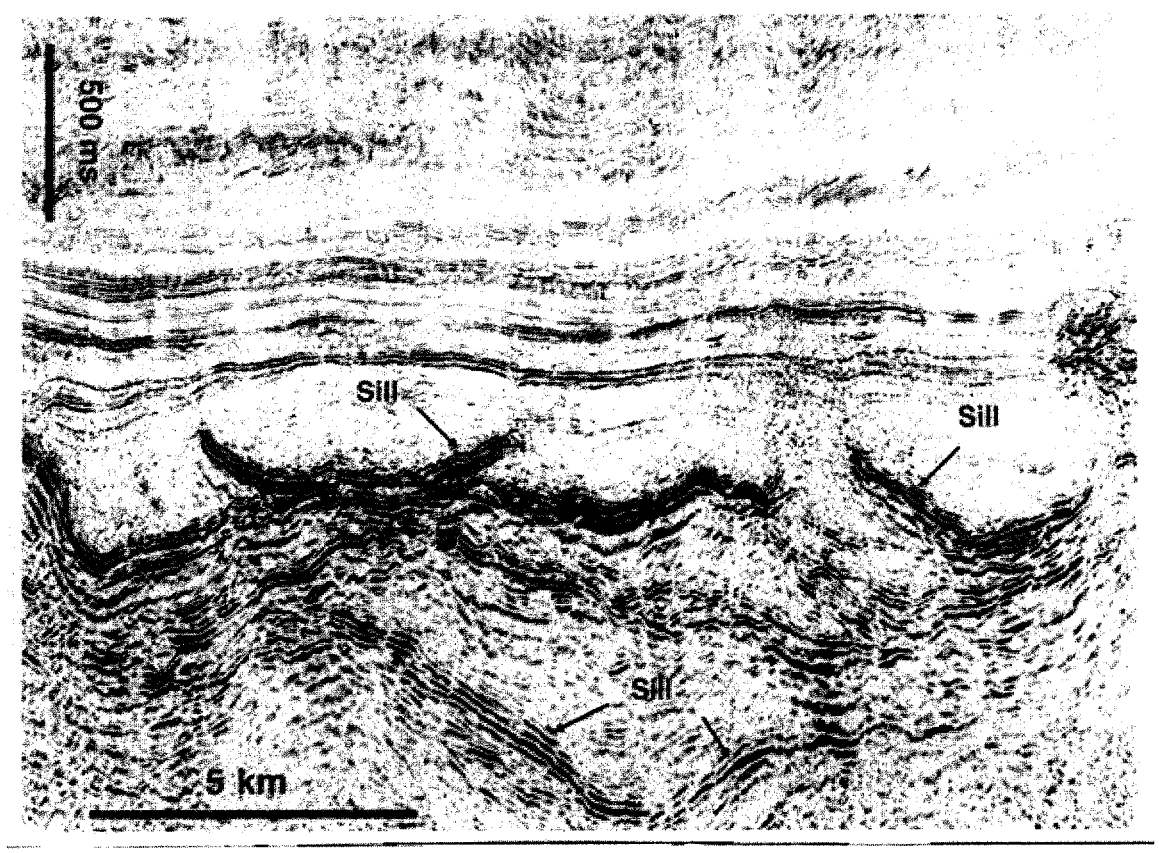
FIG. 5 illustrates a seismic profile of igneous sills intruded into a clastic sequence offshore United Kingdom, Rockall Basin.

FIG. 4 shows a seismic profile of large-scale, interconnected sand injectites, offshore United Kingdom, in the Faeroe-Shetland Basin. Sand intrusions cross a low-permeability sealing sequence of mudstone rendering the seal ineffective. The submarine-fan reservoir, marked at the top by TF, was breached, which permitted brine and hydrocarbons to migrate upward through the sand injectite.

FIG. 5 shows a seismic profile of igneous sills intruded into a clastic sequence offshore United Kingdom, Rockall Basin. Sills are interconnected, high-amplitude bodies. Note that sills appear to be breached by a fluid-expulsion structure or sand injectite on the right side of seismic profile on both sides of the word "sill".

Figure 6:
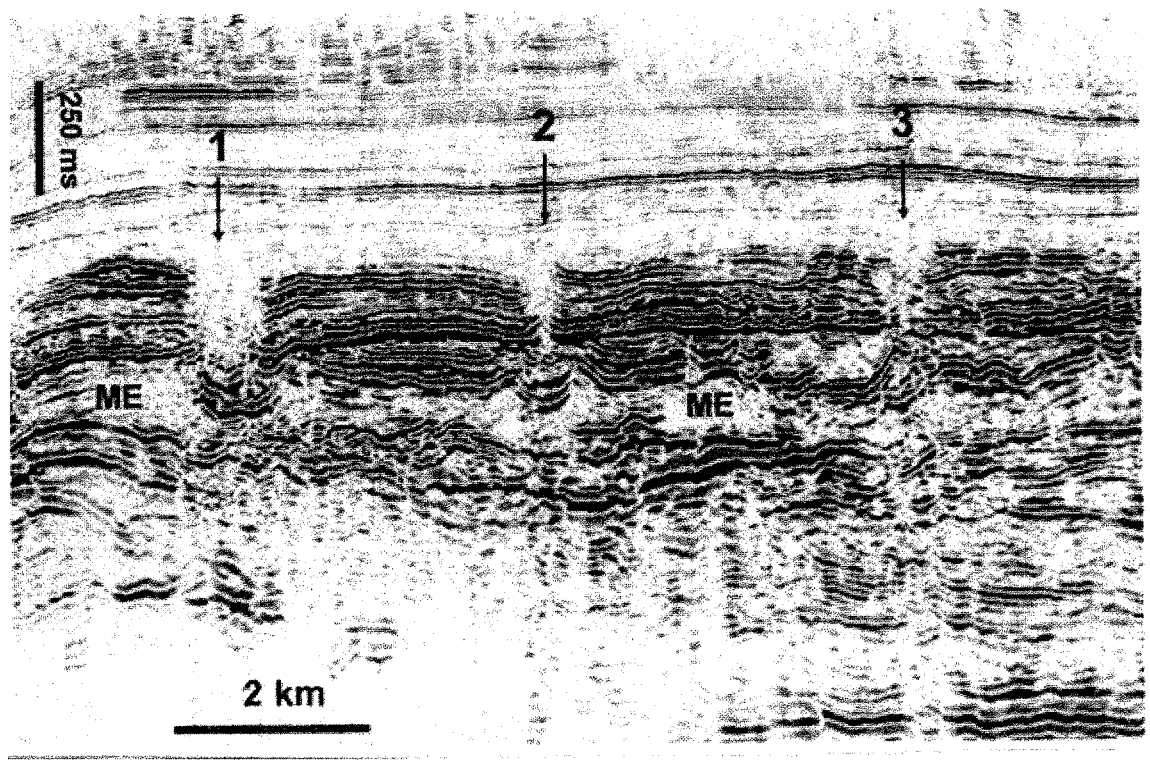
FIG. 6 illustrates a seismic profile across three dissolution pipes in the eastern Mediterranean Levant Basin.
Figure 7:
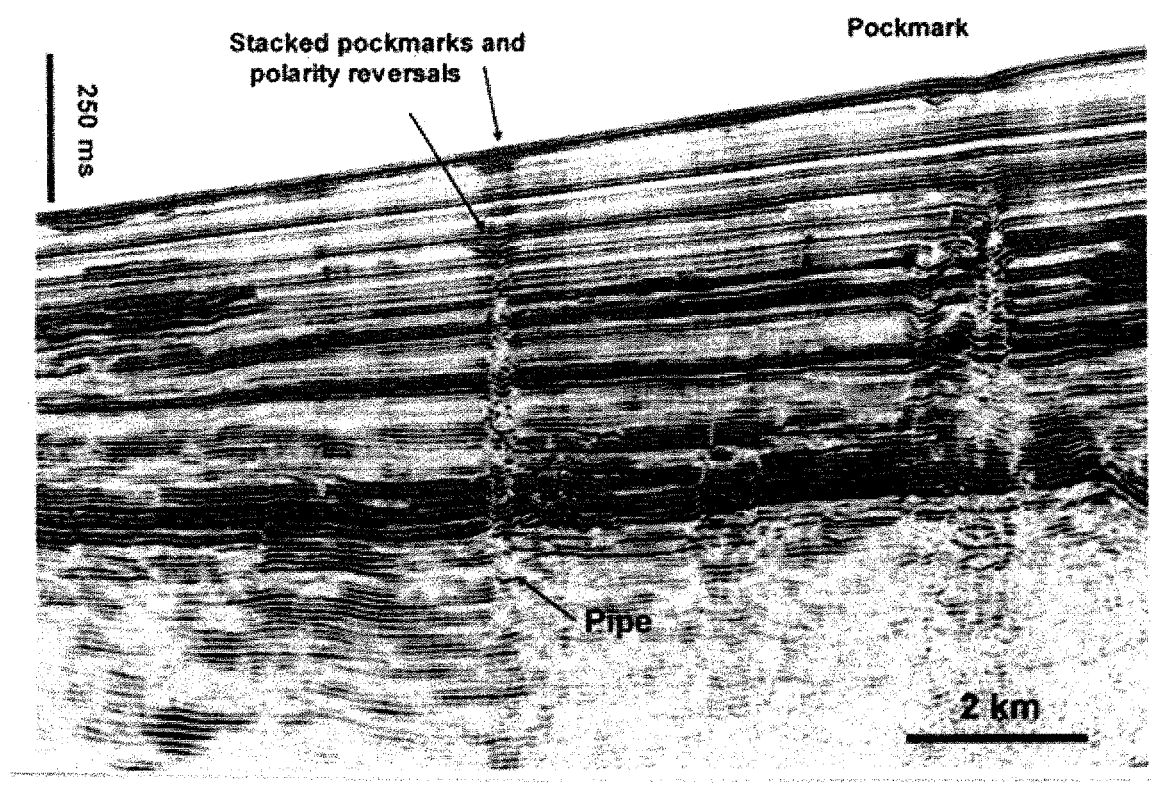
FIG. 7 illustrates a seismic profile of a blowout pipe from offshore Namibia.
Figure 8:
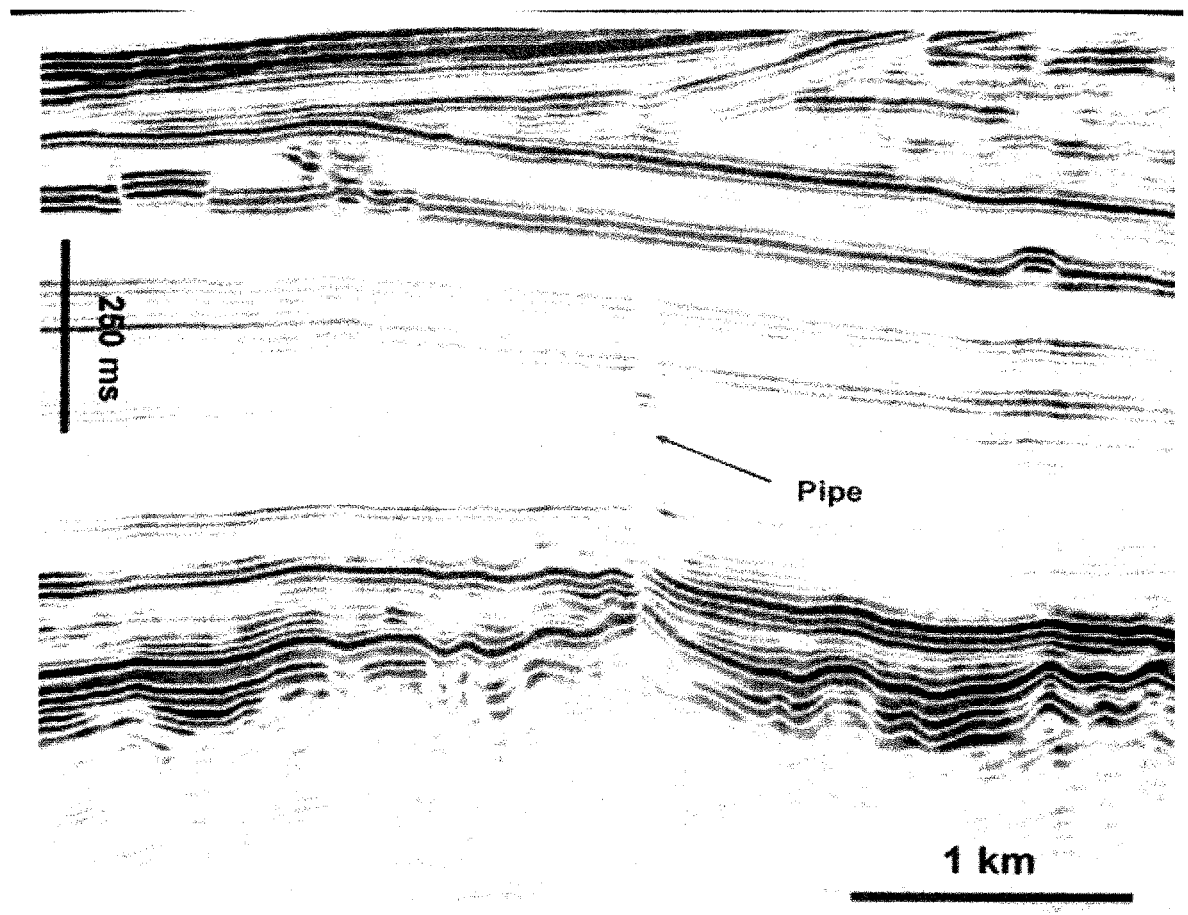
FIG. 8 illustrates a seismic profile of a seepage pipe at the arrow (offshore Scotland in the Faeroe-Shetland Basin).
Figure 9:
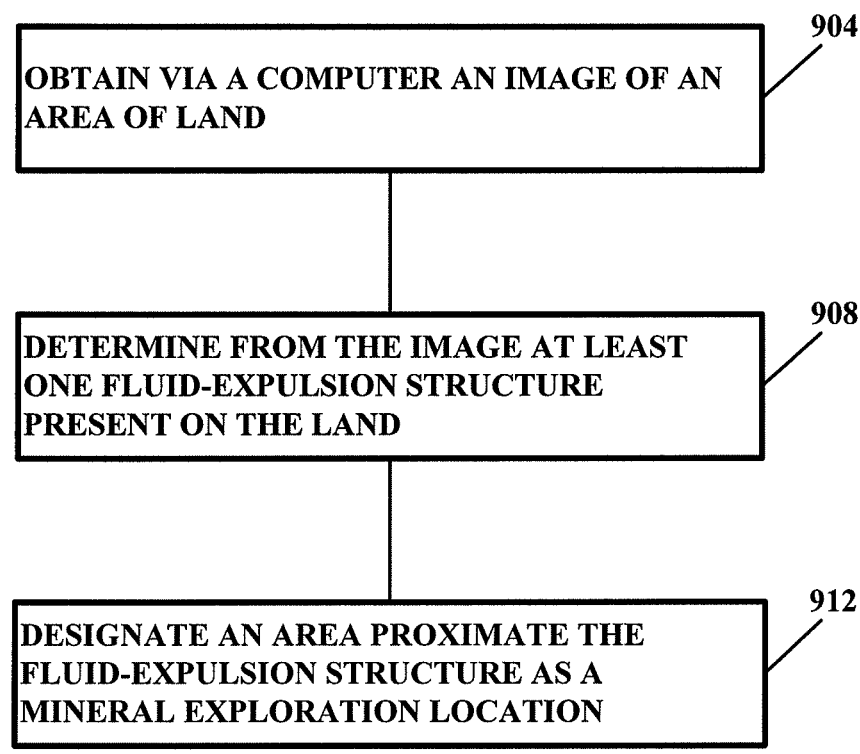
FIG. 9 illustrates a flowchart demonstrating a method of targeting a mineral exploration location in accordance with one embodiment of the invention.

Cartwright and others summarized "Pipe-bypass" systems and separated dissolution pipes, hydrothermal pipes, blowout pipes, and seepage pipes as the principal categories. In general, pipes are the least-well documented features of seal-bypass systems, and are defined as "seismically detected columnar zones of disturbed reflections that may or may not be associated with subvertically stacked amplitude anomalies." Pipes are commonly circular or subcircular in plan-form, and are easiest to identify in 3-D, horizon-based attributes. Dissolution pipes form in evaporite or carbonate karst terrains where the high-quality evaporite seal is pierced by dissolution so brine and oil can migrate upward through overburden creating and expanding the cavity (FIG. 6). The greatest potential for brine and oil expulsion probably occurs during pipe formation, but once formed these pipes can remain centers of fluid-expulsion for long periods. Hydrothermal pipes are related to igneous intrusions where hydrothermal fluid is derived from magma devolitization and heating pore fluids. The composition and volume of fluid created depends on magma composition, temperature, intrusive volume, and permeability and composition of host sediment. The mineral and trace metal suite produced by hydrothermal fluids varies according to the composition of the magma and host sediment. Hydrothermal pipes can reach heights of 1.8 ml (2.5 km). On seismic profiles, blowout pipes are columnar zones of disturbed reflections or vertically stacked amplitude anomalies (FIG. 7). The circular structure of blowout pipes is common to all diatremes and has been explained as a means to minimize energy loss caused by wall friction at the contact between the upward moving fluidized injection and the host sediment. The volume of fluid expelled is likely to be the greatest at the time of formation, but some pipes show evidence of episodic flow. Blowout pipes are limited to fine-grained sealing sequences. Permeability may be retained in the pipe for millions of years, allowing saline, metal-bearing brine and oil to stream upward across a seal. Pockmarks at the top of the structures result from strata that dip inward. Although Cartwright and others did not address the texture of material in the pipe, they cited granular particles in a fluidized system, and this material is most likely to form breccia and breccia dikes that are so common in ancient fluid-expulsion structures. Seepage pipes are recognized in seismic profiles as columnar zones of disrupted reflections with localized amplitude anomalies (FIG. 8). Seepage pipes appear to occur mainly in sand or silt-dominated sequences where fluids bleed off into permeable host sediment.

FIG. 6 shows a seismic profile across three dissolution pipes in the eastern Mediterranean Levant Basin. The regional seal is the Messinian evaporite sequence (ME), which has been dissolved below three vertical collapse pipes (labeled 1, 2, and 3). These pipes broke the evaporite seal and permitted fluid migration across the regional seal.

FIG. 7 shows a seismic profile of a blowout pipe from offshore Namibia. Vertically stacked pockmarks record a long period of upward fluid migration in the pipe.

FIG. 8 shows a seismic profile of a seepage pipe at the arrow (offshore Scotland in the Faeroe-Shetland Basin). This pipe originated from the crest of a small fold on the top surface of an aquifer. The absence of pockmarks suggests a slow rate of upward brine, oil, or gas migration from the aquifer.

Predicting Locations of Fluid-Expulsion Structures

Fluid-expulsion structures occur in sedimentary basins in predictable locations that are controlled by a combination of preexisting regional structures, faults and folds in the sedimentary basin, and regional geometry of sedimentary units in the sedimentary basin. Predicting locations of fluid-expulsion structures is difficult to quantify for all sedimentary basins because sedimentary fill, tectonic evolution, and structural settings are different for each basin. However, geologic map analysis can narrow the region in which expulsion structures can be expected to have formed.

Brine- and oil-expulsion structures are commonly preserved in strata deposited on stable continental shelves near the continental slope break. Pipes form distant from the deepest and most quickly subsiding part of the sedimentary basin where temperatures are highest and metals are leached from organic shale and siltstone. Metal-bearing brines and hydrocarbons are pumped to the edges of the subsiding sedimentary basin where preexisting geologic features, such as basement arches and faults, represent zones of weakness in seals or form barriers to migration of overpressured brine and hydrocarbons. In the U.S., structures such as the San Rafael Swell, Utah, Cincinnati Arch, Ohio, Nashville Dome, Tennessee, and Nemaha Arch, Oklahoma, are the types of regional structures that may have localized fluid-expulsion structures in crestal regions or on the flanks of these uplifts. Faults and folds, including basement structures, that occur in the path of migrating metal-bearing brines and hydrocarbons on the thin edges of subsiding sedimentary basins are ideal places for upward migration of metal-bearing brine and oil. The Lisbon Valley stratabound copper deposits are classic examples in which hydrocarbon-bearing, metal-rich, warm, reduced, acid brine and minor oil migrated upward along a fault near the crest of the Lisbon Valley Anticline, and vented into aquifers of the Burro Canyon and Dakota Formations (Cretaceous) that now contain stratabound copper deposits (Hahn and Thorson, 2006). Flanks and crests of anticlines are predictable locations for brine- and oil-expulsion expulsion features where tension fractures may provide weaknesses that can be exploited by overpressured brine and oil plumes. The regional geometry of sedimentary units in a subsiding sedimentary basin may cause fluid-expulsion structures to localize over the flexure that marks the transition from shallow-marine deposits to shelf sediment, as in the Anadarko basin, Oklahoma. In the Mid-Continent, that flexure in the Appalachian Basin may have produced numerous features. Finally, at places where aquifers thin between aquitards against regional arches or anticlinal folds, overpressured fluid may break seals and be injected upward forming linear zones of pipes or dikes along the flanks of the fold.

As can be seen by the flowcharts in FIGS. 9, 10A, 10B, 11, 12A, and 12B, a variety of methods can be utilized to practice embodiments of the invention. Referring first to flowchart 900 a method of targeting a location for mineral deposit exploration can be seen. In block 904, a computer is used to obtain an image of an area of land. The image is used to determine at least one fluid-expulsion structure present on the land, as shown by block 908. Based on this determination, an area proximate the fluid-expulsion structure can be designated as a mineral exploration location, i.e., a targeted location.

Figure 10A:
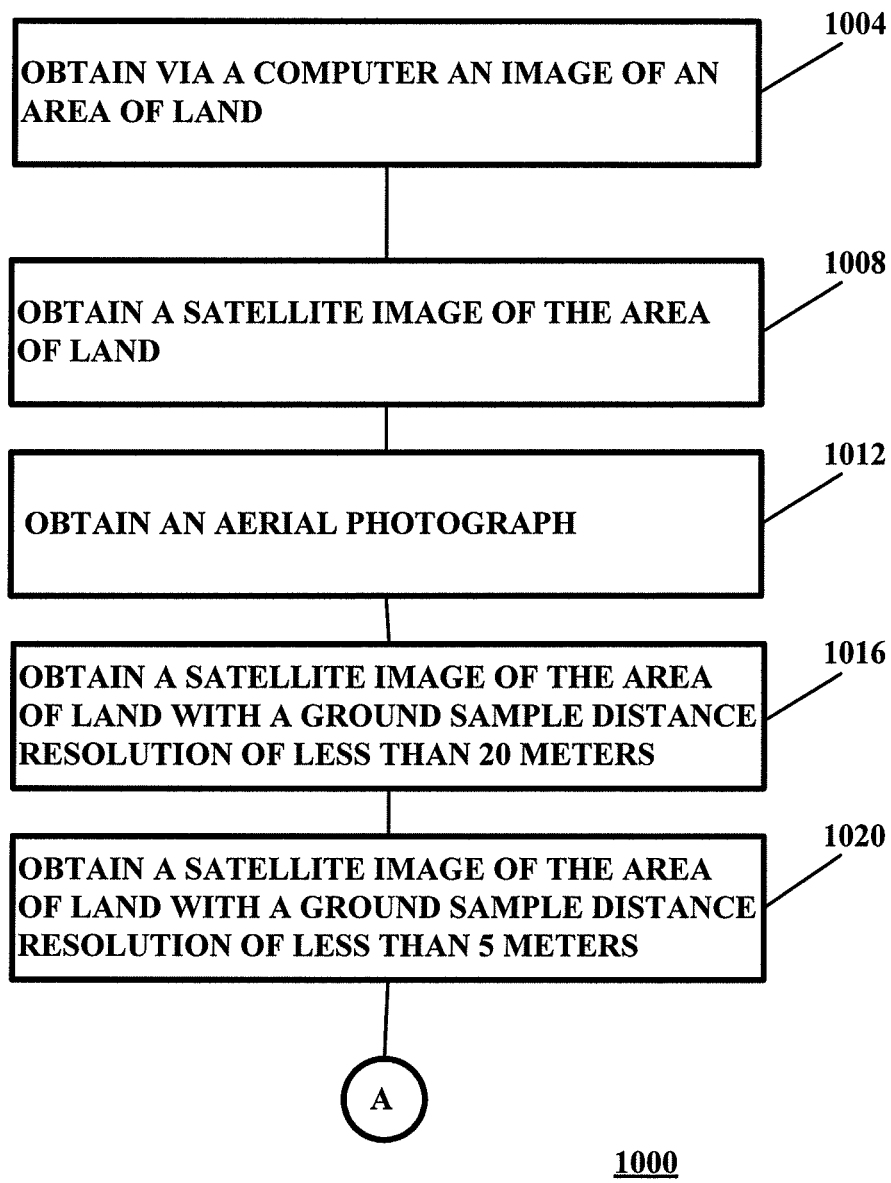
FIGS. 10A and 10B illustrate a flowchart demonstrating a method of targeting a mineral exploration location in accordance with another embodiment of the invention.
Figure 10B:
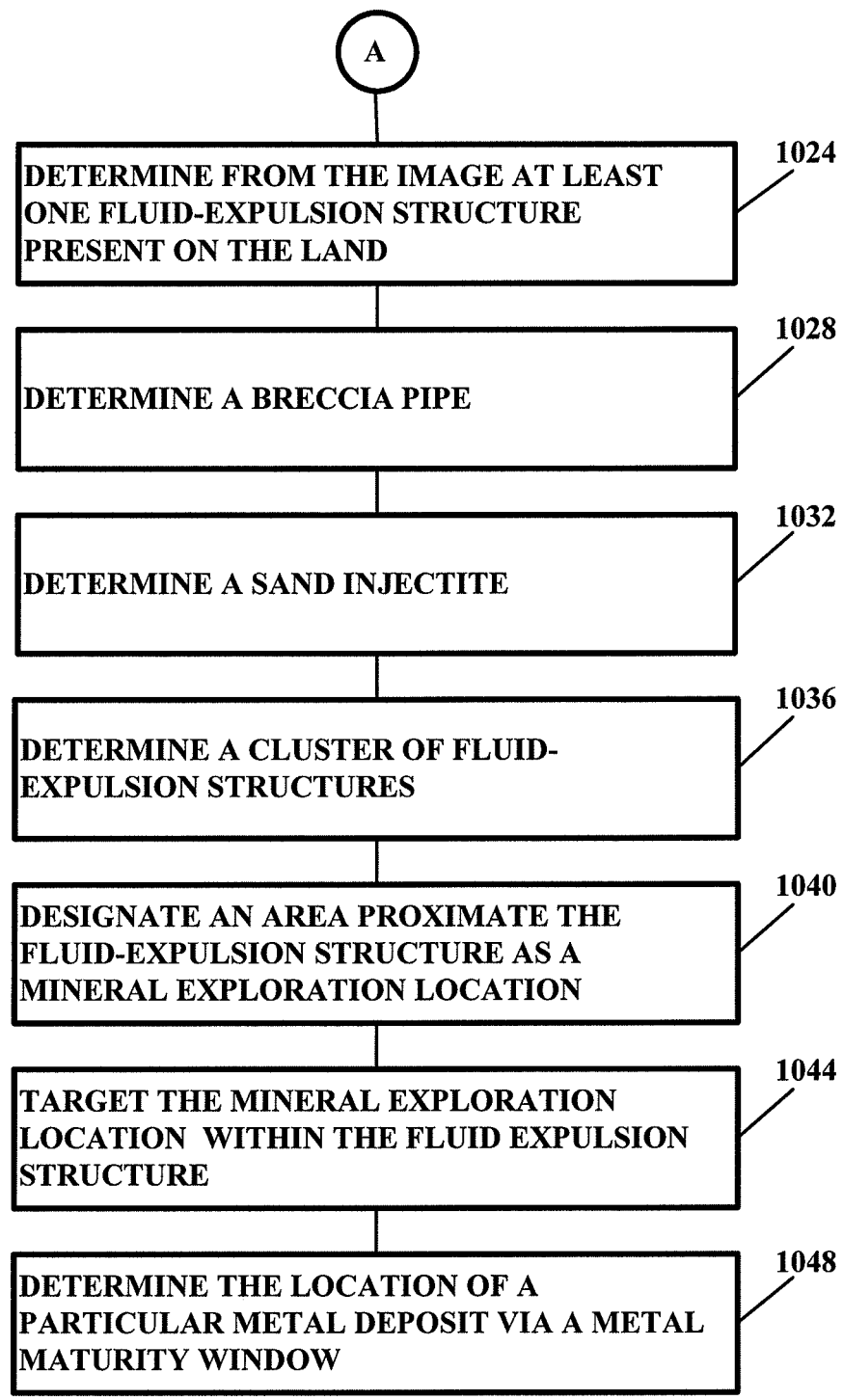

FIGS. 10A and 10B illustrate a more detailed example of a method of targeting a location for mineral exploration in flowchart 1000. In block 1004, an image of an area of land can be obtained. Blocks 1008, 1012, and 1016 offer three examples of how such an image could be obtained. For example, block 1008 illustrates that a satellite image of an area of land could be obtained. Thus, for example, satellite images from commercial satellite services could be utilized. One example of a commercial satellite service is Google. Block 1012 shows that an aerial photograph of an area of land could be obtained. In some instances, the resolution of the image of the land area may be insufficient to determine enough detail. In such instances, a higher resolution image may be obtained. For example, block 1016 shows an example in which a ground sample distance resolution of 20 meters could be obtained. As another example, a ground sample distance resolution of 5 meters could be obtained, as shown by block 1020.

The image can then be transmitted to a computer for use by an analyst or pattern recognition software program. Thus, block 1024 illustrates that the image can be reviewed so as to determine if at least one fluid-expulsion structure is present. As explained herein, fluid-expulsion structures have been shown by the inventor to be indicators of the presence of mineral deposits worthy of production. The method of determining the presence of a fluid-expulsion structure may be performed by an individual analyst or it may be performed through the use of software programmed to search for at least one physical pattern on the image. Block 1028 illustrates that a fluid-expulsion structure in the form of a breccia pipe can be searched for. Similarly, block 1032 illustrates that a fluid-expulsion structure in the shape of a sand injectite can be searched for. In addition, one may search for multiple fluid-expulsion structures. Thus, one may direct the search for a cluster of fluid-expulsion structures found on the image, for example, as shown by block 1036.

Once a fluid-expulsion structure is located on the image, the area proximate to that fluid-expulsion structure may be designated as an exploration location. This is shown by block 1040. As one example, one can target the area within the fluid-expulsion structure itself for mineral exploration, as shown by block 1044.

A deposit-type approach may also be conducted for a selected site. This can be accomplished, as shown by block 1048, by utilizing metal-maturity windows to select a range of metal compositions desired in a mineral deposit.

Figure 11:
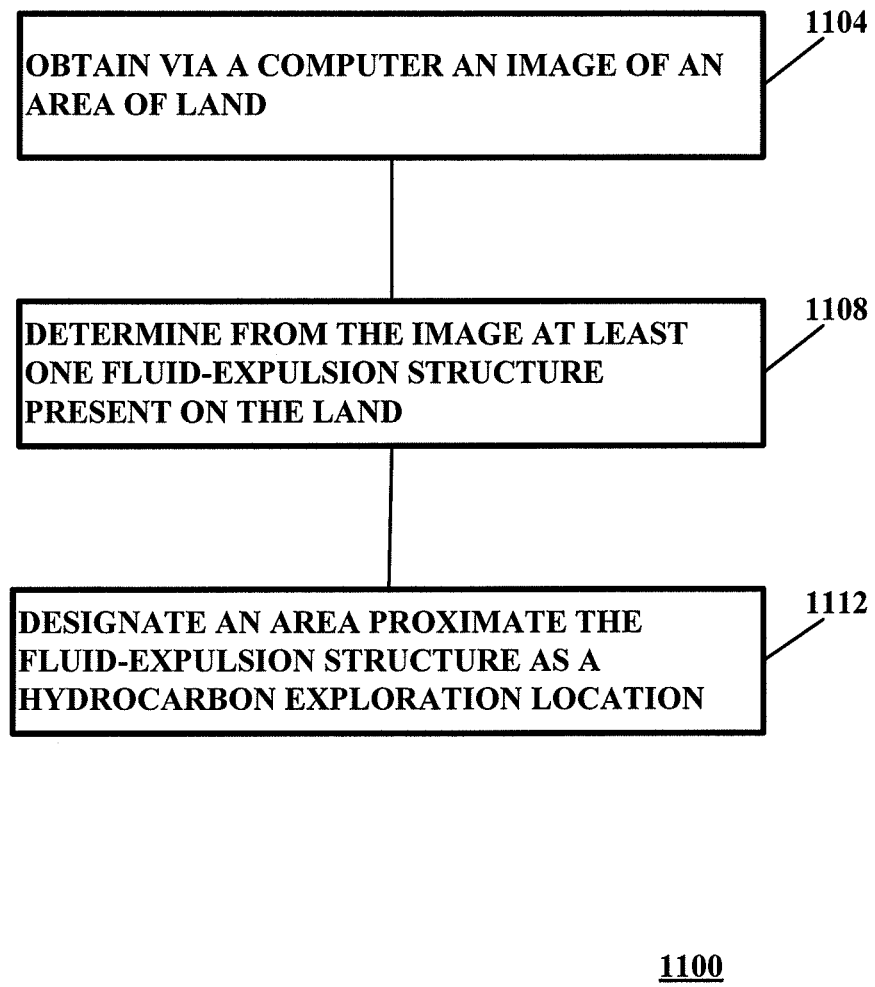
FIG. 11 illustrates a flowchart demonstrating a method of targeting a hydrocarbon exploration location in accordance with one embodiment of the invention.

Referring now to FIG. 11, a flowchart 1100 demonstrating a method of locating a hydrocarbon reservoir can be seen. In block 1104, a computer image of an area of land can be obtained. In block 1108 a determination can be made from the image of at least one fluid-expulsion structure being present on the land. In block 1112, an area proximate to, or on, the fluid-expulsion structure can be designated as a hydrocarbon exploration location.

Figure 12A:
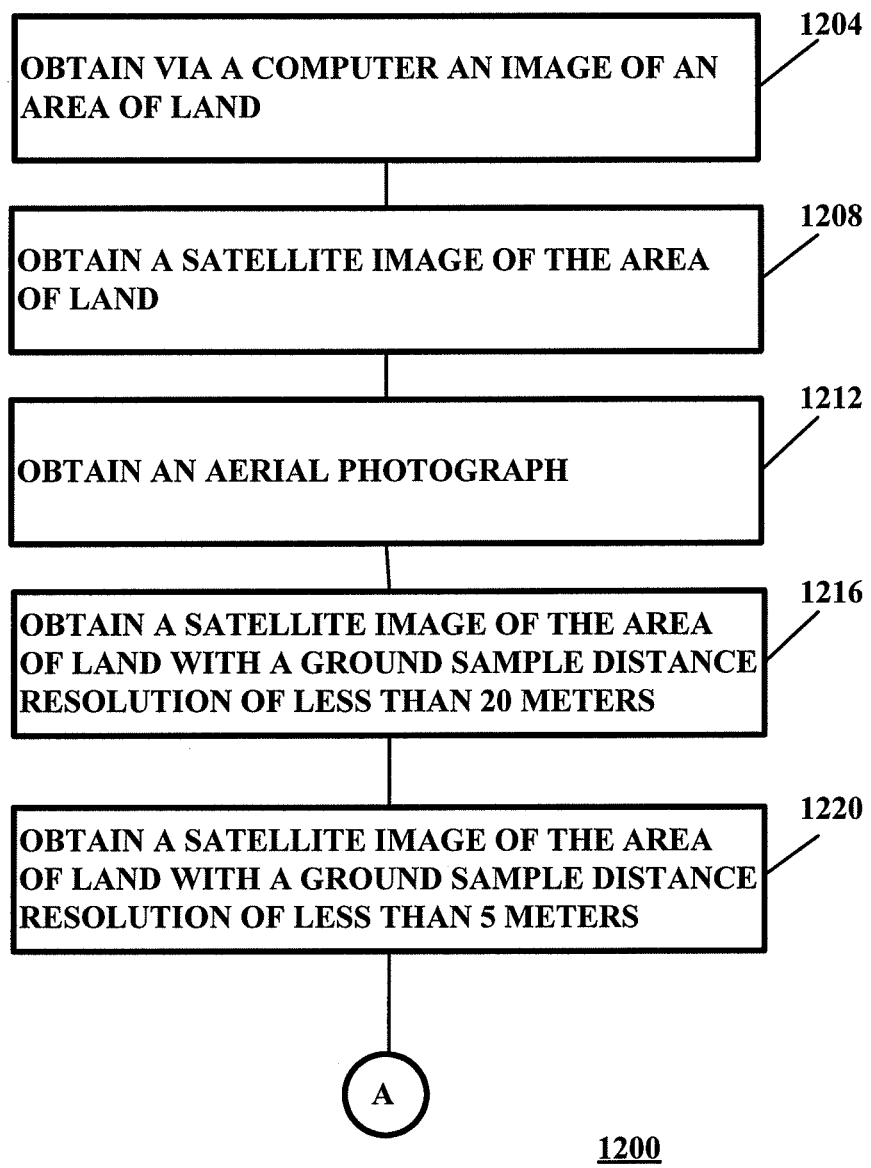
FIGS. 12A and 12B illustrate a flowchart demonstrating a method of targeting a hydrocarbon exploration location in accordance with another embodiment of the invention.
Figure 12B:
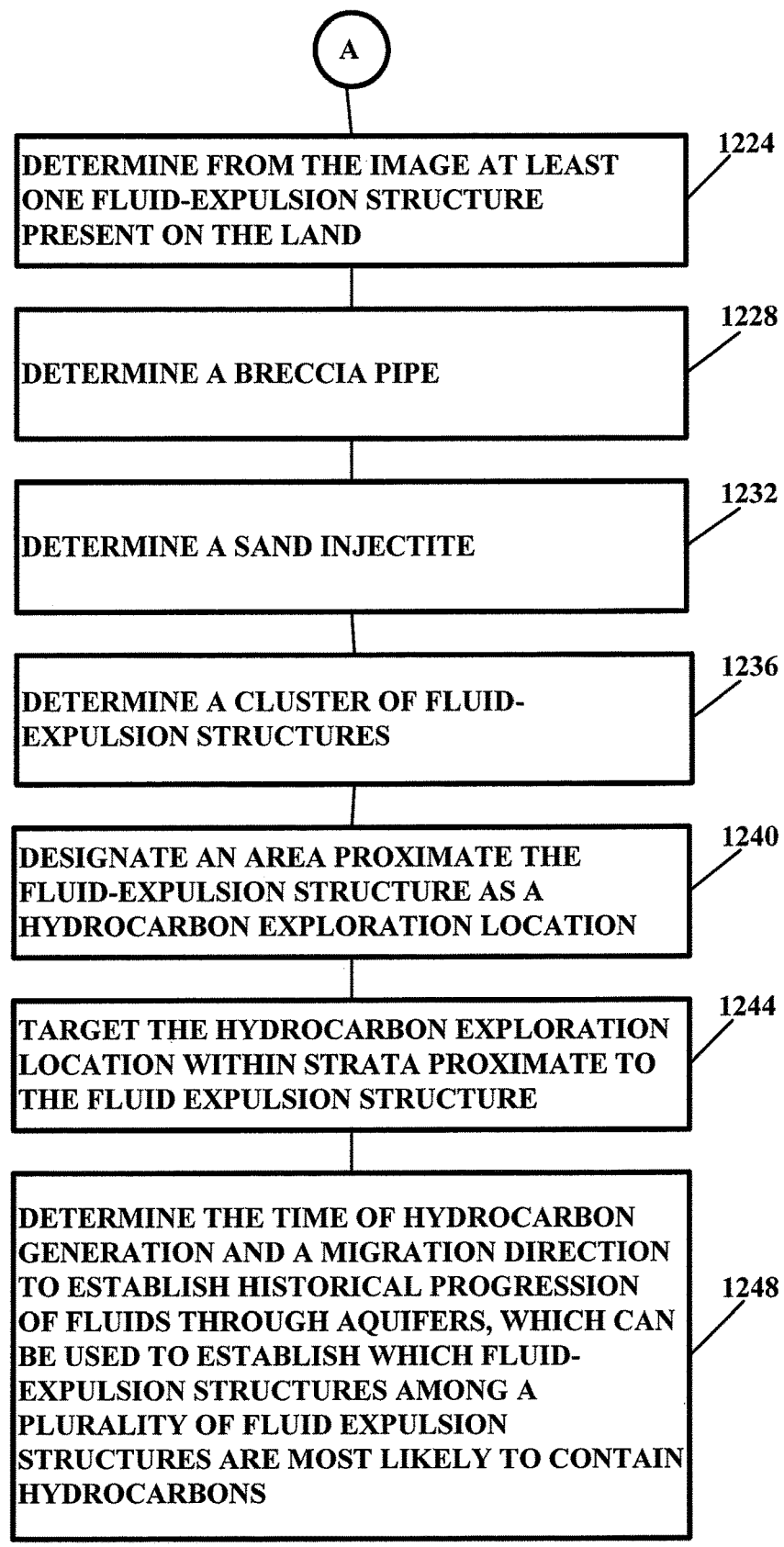

FIGS. 12A and 12B illustrate a more detailed example of a method of targeting sites for further hydrocarbon exploration. In flowchart 1200, a computer image can be obtained of an area of land, as shown in block 1204. As noted above, the computer image can be generated from a satellite image as shown in block 1208 or via an aerial photograph as shown in block 1212. The image can be obtained with the necessary resolution to determine land features. For example, block 1216 shows an example of an image obtained with a ground sample distance resolution of less than 20 meters. Block 1220 shows an example of using an image with a ground sample distance resolution of less than 5 meters. One might choose to use smaller resolutions, as desired. The image can be transmitted across a network to a site used by an exploration company. Thus, one might use a digital image of the land site and transmit it across a digital network for use or display on an exploration company's computer. Or, for example, one might purchase a file of multiple images and store that file on a computer memory for use in the target analysis process.

In block 1224 of flowchart 1200, a determination can be made as to whether a fluid-expulsion structure is present on the image. This determination could be made by a human analyst or by a software program configured to search for a pattern on the image. Block 1228 illustrates that the image could be searched for a breccia pipe. Block 1232 illustrates that the image could be searched for a sand injectite. And, block 1236 illustrates that the image could be searched for more than one fluid-expulsion structure. For example, a cluster of fluid-expulsion structures could be searched for.

Based on the results of the image evaluation, an area of land on the image may be targeted. For example, an area proximate to the fluid-expulsion structure could be designated as a hydrocarbon exploration location, as shown in block 1240. As noted above, hydrocarbons may utilize voids in the strata around the fluid expulsion structure to migrate. Thus, the targeted location for development can be further targeted to strata proximate to the fluid expulsion structure, as shown by block 1244. Moreover, one may estimate the time of hydrocarbon generation and determine a migration direction in order to determine a historical progression of the hydrocarbon fluids through aquifers. This can then be used to establish which fluid expulsion structures among a plurality of fluid expulsion structures are most likely to contain hydrocarbons, as shown by block 1248.

Figure 13:
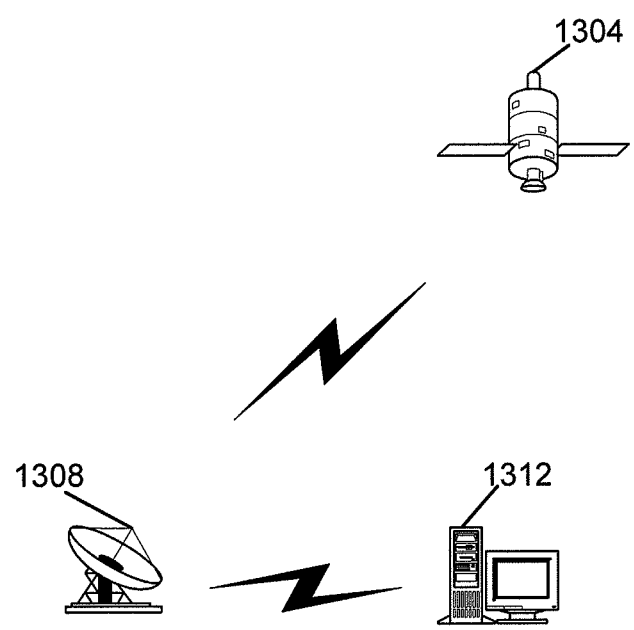
FIG. 13 illustrates a diagram of a system for obtaining images of prospective exploration targets in accordance with one embodiment of the invention.

Referring now to FIG. 13, an example of a system for obtaining satellite images can be seen. In FIG. 13, a satellite 1304 takes a satellite image of an area of land. The image is transmitted to a receiver 1308 which in turn transmits the image across a computer network to computer 1312. From computer 1312, the image can be analyzed or transmitted further to yet another computer and across a second computer network.

Figure 14:
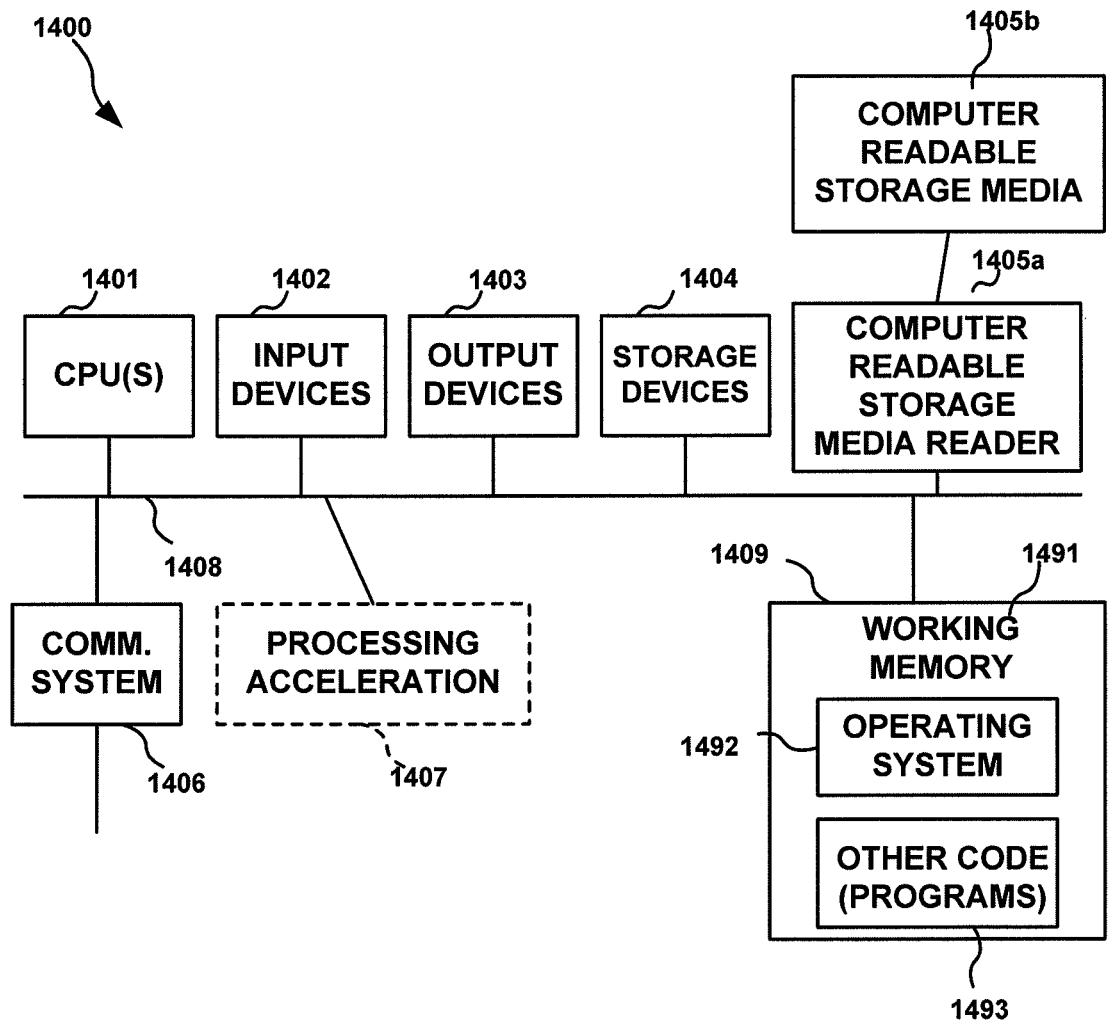
FIG. 14 illustrates a block diagram of a computer that can be used to implement a computerized device in accordance with one embodiment of the invention.

FIG. 14 illustrates a block diagram of a device that can be used for the computer in FIG. 13 as well as the other computerized devices described herein. System 1400 is shown comprised of hardware elements that are electrically coupled via bus 1408, including a processor 1401, input device 1402, output device 1403, storage device 1404, computer-readable storage media reader 1405a, communications system 1406 processing acceleration (e.g., DSP or special-purpose processors) 1407 and memory 1409. Computer-readable storage media reader 1405a is further coupled to computer-readable storage media 1405b, the combination comprehensively representing remote, local, fixed and/or removable storage devices plus storage media, memory, etc. for temporarily and/or more permanently containing computer-readable information, which can include storage device 1404, memory 1409 and/or any other such accessible system 1400 resource. System 1400 also comprises software elements (shown as being currently located within working memory 1491) including an operating system 1492 and other code 1493, such as programs, applets, data and the like.

System 1400 has extensive flexibility and configurability. Thus, for example, a single architecture might be utilized to implement one or more servers that can be further configured in accordance with currently desirable protocols, protocol variations, extensions, etc. However, it will be apparent to those skilled in the art that embodiments may well be utilized in accordance with more specific application requirements. For example, one or more system elements might be implemented as sub-elements within a system 1400 component (e.g. within communications system 1406). Customized hardware might also be utilized and/or particular elements might be implemented in hardware, software (including so-called "portable software," such as applets) or both. Further, while connection to other computing devices such as network input/output devices (not shown) may be employed, it is to be understood that wired, wireless, modem and/or other connection or connections to other computing devices might also be utilized. Distributed processing, multiple site viewing, information forwarding, collaboration, remote information retrieval and merging, and related capabilities are each contemplated. Operating system utilization will also vary depending on the particular host devices and/or process types (e.g. computer, appliance, portable device, etc.) Not all system 1400 components will necessarily be required in all cases.

CONCLUSIONS

The three examples discussed above illustrate that new stratabound exploration targets can be generated in areas that have been overlooked and that interest can be rekindled in abandoned mining districts, and target hydrocarbon reservoirs. Screening for ancient fluid-expulsion structures is a quick and inexpensive method to locate specific places where chemical reactions between expelled reduced brine and oxidized host rocks are expected to form stratabound mineral deposits. The same processes that force brines to break seals and migrate upward also apply to upward migration of oil and gas into higher reservoirs. The exploration concepts outlined in this patent are an extremely powerful, and time-efficient way to locate mineral and hydrocarbon exploration targets. The concepts outlined in this patent are not believed to be part of exploration knowledge of the mineral or oil industries. Thus, it provides a competitive advantage in exploration.

These concepts are global in scope. Fluid-expulsion structures or linear expulsion bands should occur in all oil-producing, sedimentary basins. Cartwright and others (2007) demonstrated conclusively that seal ruptures in hydrocarbon reservoirs are common events in modern subsea sedimentary basins. Therefore, Neoproterozoic and Phanerozoic sedimentary basins are possible places to explore. Using these concepts, decisions about where to explore to the greatest advantage is a simple and quick process that employs data commonly available to the public. For most oil-producing basins, information in the public domain describes burial histories and timing of gas and oil generation. This information can be integrated with the metal-maturity window concept and with information on brine-oil migration pathways to gain a more precise understanding of probable locations of stratabound mineral deposits and hydrocarbon reservoirs.

Screening for fluid-expulsion structures will not be equally effective everywhere because ground cover can obscure surface indications of structures and breccia intrusions on satellite images, and render remote exploration methods ineffective. Vegetation can obscure surface features on the ground, so satellite and photographic observations will be hampered in jungle terrain. Glacial till, dune fields, and thick, intensely weathered mantles can cover or destroy surface characteristics of circular features. Air-borne geophysical methods might aid in locating circular features, but much of the effectiveness of geophysical methods will depend on thickness of glacial till, sand, or laterite.

Ground-based geophysical and geochemical surveys were used in northwestern Arizona, and in the Mid-Continent these studies may be useful precursors to drilling at circular structures. Surface surveys of magnetic signatures, AMT results, and gravity profiles may be useful tools to locate drill targets for mineral deposits. Soil geochemical surveys were shown to be effective for locating potential mineralized breccia pipes in northwestern Arizona. Helium soil-gas surveys have shown mixed success as an exploration tool in northwestern Arizona, and although radon soil-gas surveys were not used, they may be effective tools. Interpretation of seismic profiles may detect vertical pipes of breccia that record ruptured reservoir seals where seismic patterns of layered strata are jumbled. Stream-sediment surveys may provide local geochemical data important to locating mineral deposits near or in fluid-expulsion structures. Not all geophysical and geochemical survey methods will be useful in all geologic and geographic settings, and different methods will have to be matched to specific problems.

The quality of satellite and photographic images used to locate ancient fluid-expulsion structures facilitates improved results. In some areas, satellite images, such as Google Earth images, are of poor quality and little can be seen on the surface. In other areas, such as northwestern Arizona, the circular pipes are too small to be seen on Google images. Images from NASA World Wind are based on 30 m pixels, and they are generally too coarse to detect circular features on the scale of fluid-expulsion structures. High-resolution satellite images are available by subscription, and these could be very useful. For the most part, currently available Google images (provided at www.google.com) are satisfactory at the current scale used for exploration.

Fluid-expulsion structures can be characterized by the following features:

Fluid-expulsion structures occur in most oil-producing sedimentary basins.

Fluid-expulsion structures occur in clusters.

Fluid-expulsion structures are generally circular, oval, or subcircular in shape.

Fluid-expulsion structures can be linear dikes, vermiform, or lenticular structures.

The outer rim is generally uplifted, with an internal moat, and a central uplift. Annular rings are common, and the rings can be fault bounded.

Breccia and randomly oriented blocks of sedimentary rock occur throughout the structure.

Breccias are commonly sedimentary rock fragments in a finely ground matrix of sedimentary rock debris. Some structures contain igneous rock clasts and some matrix can form from finely comminuted igneous material.

Breccia, clasts, and matrix are chemically reduced.

Bitumen, asphalt, or liquid hydrocarbons occur in breccia and in permeable host rocks.

Permeable host strata that are penetrated by sedimentary intrusive breccia are reduced.

Fluid-expulsion structures and permeable host rocks contain sulfide minerals and hydrocarbons.

Magnetic low anomalies occur over fluid-expulsion structures because magnetic minerals were chemically reduced.

Low gravity anomalies may characterize the less-dense brecciated core of the structure.

AMT soundings may locate conductive zones of sulfide minerals as stratabound deposits in host rocks or in the breccia pipe, but AMT soundings are of no use to find hydrocarbons.

Chemical analyses of soil samples may show high anomalies of Cu, As, Ag, Co, Cr, Hg, Mo, Ni, Pb, Zn, Sb, Sr, U, V, and P.

Rock exposed at the surface can contain oxidized Cu and Fe minerals.

Shatter cones are absent, but diagenetically created cone-in-cone structures may occur in carbonate rocks.

Coesite and shocked quartz are absent, although deformed lamellae in quartz (PDFs) could superficially resemble shocked quartz and have been inherited from protoliths.

"Glass" and fused silicate rocks are absent, but bitumen can superficially resemble fused rock.

Authigenic quartz, saddle dolomite, rhombs of dolomite, rhodochrosite, and calcite are common as late cement in carbonate-rich breccia and host rocks.

Some fluid-expulsion structures are the focus of hydrocarbon reservoirs.

The potential value of stratabound mineral deposits associated with fluid-expulsion structures is immense in terms of potential volume of metal and the great number of chemical elements of commercial value that were transported in reduced brines. It has been estimated that there is an undiscovered uranium endowment in northwestern Arizona and adjacent Utah at 1,300,000 tons of $U_3O_8$ in an area of 16,728 sq mi (about 43,493 sq km). On the San Rafael Swell, the Temple Mountain mining district produced 1,287,000 lbs of $U_3O_8$ and 3,800,000 lbs of $V_2O_5$ between 1948 and 1956 (Bartsch-Winkler and others, 1990), and that could represent only small amount of the uranium and vanadium that existed before erosion. In the Mid-Continent region, the value of stratabound mineral deposits associated with fluid-expulsion structures cannot be estimated because production data are missing from the Hicks Dome area, and the Serpent Mound area has not been mined for MVT-type deposits. Metal endowment deposited from the reduced brine produced in the Appalachian basin could include uranium, vanadium, copper, and silver, but also could contain significant gold, platinum, palladium, ruthenium, and other platinum group metals in addition to lead and zinc. It is unlikely that this range of endowed metals has been targeted in previous exploration programs in the Mid-Continent region.

The potential value of hydrocarbon accumulations in fluid-expulsion structures is immense. Estimated reserves of a few oil fields, which are most likely associated with fluid-expulsion structures, range between 10 MMBO to 700 MMBO, and at $40.00 USD/barrel would be worth 400 million USD and 280 billion USD. Reservoirs in fluid-expulsion structures are generally shallow in ancient sedimentary basins. Bore holes on land are much cheaper to drill than drilling over deep marine oil reservoirs. Moreover, many of these structures occur near well-developed infrastructures that can support drilling projects. It is unlikely that oil and gas reservoirs associated with fluid-expulsion structures have been targeted by explorationists, although oil is produced from many fluid-expulsion structures, exploration geologists have not made the connection between fluid-expulsion structures and breaches of reservoir seals in subsea basins.

Two types of targets exist in fluid-expulsion structures for stratabound mineral deposits and for hydrocarbon reservoirs. Stratabound mineral deposits in fluid-expulsion structures have targets in: (1) Breccia pipes that were mineralized by upward migrating, metal-bearing, warm, reduced brine where redox chemical reactions precipitated mineral deposits; (2) Peripheral stratabound mineral deposits in permeable rock units adjacent to the breccia pipes where redox chemical reactions precipitated mineral deposits in tabular form. Hydrocarbon resources in fluid-expulsion structures have targets in: (1) Breccia pipes that had seals above porous breccia into which hydrocarbons migrated; and (2) Reservoirs peripheral to breccia pipes that were formed where hydrocarbons migrated laterally into permeable rock units overlain by seals.

The exploration industry has not made the connection from generation of oil and metal-bearing brine, to fluid migration and fluid-expulsion structures, and to hydrocarbon traps near seal ruptures and stratabound mineral deposits. Competition for prospective land should be minimal outside areas with known stratabound mineral production, and opportunities to secure land positions to drill for hydrocarbons should be less costly using these new concepts.

These concepts open new terrain to exploration programs that the mineral and oil exploration industry currently ignores. That many of the circular structures in the U.S. have been identified as meteorite impact structures is a positive diversion because "impacts" generate little exploration interest. Similarly, circular structures that have been investigated as possible kimberlite pipes are likely to be ignored with regard to stratabound and hydrocarbon exploration because geophysical signatures of fluid-expulsion structures are different from buried kimberlite bodies. Using fluid-expulsion structures as a tool to target stratabound mineral deposits and hydrocarbon reservoirs is not being applied by the exploration industry. A company that has the vision to bring this intellectual property to mineral- and hydrocarbon-exploration programs has a clear competitive advantage.

While various embodiments of the invention have been described as methods or apparatus for implementing the invention, it should be understood that the invention can be implemented through code coupled to a computer, e.g., code resident on a computer or accessible by the computer. For example, software and databases could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that embodiments of the invention also be considered protected by this patent in their program code means as well. Furthermore, the embodiments of the invention may be embodied as code stored in a computer-readable memory of virtually any kind including, without limitation, RAM, ROM, magnetic media, optical media, or magneto-optical media. Even more generally, the embodiments of the invention could be implemented in software, or in hardware, or any combination thereof including, but not limited to, software running on a general purpose processor, microcode, PLAs, or ASICs.

It is also envisioned that embodiments of the invention could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

It is also noted that many of the structures, materials, and acts recited herein can be recited as means for performing a function or step for performing a function. Therefore, it should be understood that such language is entitled to cover all such structures, materials, or acts disclosed within this specification and their equivalents, including the matter incorporated by reference.

It is thought that the apparatuses and methods of embodiments of the present invention and its attendant advantages will be understood from this specification. While the above description is a complete description of specific embodiments of the invention, the above description should not be taken as limiting the scope of the invention as defined by the claims.

What is claimed is:
1. A method comprising:
 obtaining via a computer an image of an area of land;
 determining from the image at least one expulsion breccia pipe present on the land by:
  detecting a generally circular outer rim in the image;
  detecting an uplifted center in the image;
  detecting an internal moat between the generally circular outer rim and the uplifted center in the image;
 locating a subsiding, sedimentary basin of the at least one expulsion breccia pipe in a Neoproterozoic or Phanerozoic basin;
 determining a burial history, a burial depth, a geometry of basin fill, and an internal basin structure for the subsiding, sedimentary basin;
 analyzing a seismic profile and stratigraphy for the at least one expulsion breccia pipe;
 modeling a brine-flow pathway to estimate a location that is most likely to contain specific types of metallic mineral deposits based on the subsiding sedimentary basin;
 employing information about the location of the at least one expulsion breccia pipe to position testing of the geochemistry of material proximate to the at least one expulsion breccia pipe;
 taking magnetic readings of the expulsion breccia pipe to detect magnetic low anomalies indicative of chemically reduced magnetic minerals within the expulsion breccia pipe; and designating an area proximate the expulsion breccia pipe as a mineral exploration location for at least one mineral that formed from metal bearing, reduced fluid that originated at a subsiding sedimentary basin, wherein the at least one mineral includes an element chosen from uranium, vanadium, copper, silver, chromium, molybdenum, lead, zinc, strontium, antimony, gold, platinum, cobalt, palladium, ruthenium, and lanthanum;

obtaining an exploration license for the area proximate the expulsion breccia pipe.

2. The method as claimed in claim 1 wherein the determining from the image at least one expulsion breccia pipe comprises determining a cluster of expulsion breccia pipes.

3. The method as claimed in claim 1 wherein the obtaining the image comprises obtaining a satellite image of the area of land.

4. The method as claimed in claim 1 wherein the obtaining the image comprises obtaining an aerial photograph.

5. The method as claimed in claim 1 wherein the obtaining the image comprises obtaining a satellite image of the area of land with a ground sample distance resolution of less than 20 meters.

6. The method as claimed in claim 1 wherein the obtaining the image comprises obtaining a satellite image of the area of land with a ground sample distance resolution of less than 5 meters.

7. The method as claimed in claim 1 wherein the mineral exploration location is targeted within the expulsion breccia pipe.

8. The method as claimed in claim 1 and further comprising:
determining a location of a particular metal deposit via a metal-maturity window.

9. The method of claim 1 and further comprising:
testing the breccia within the expulsion breccia pipe to determine whether the breccia within the expulsion breccia pipe is chemically reduced.

10. The method of claim 9 and further comprising:
testing the expulsion breccia pipe for a copper or iron cap.

11. The method of claim 10 and further comprising:
testing the expulsion breccia pipe and a permeable host rock for the presence of hydrocarbons and sulfide minerals.

12. A method of exploring for mineral deposits suitable for production, the method comprising:
identifying at least one known hydrocarbon producing basin;
utilizing a computer to obtain a surface-area image of an area of land;
determining from the surface-area image of the area of land at least one expulsion breccia pipe within the hydrocarbon producing basin;
locating a subsiding, sedimentary basin of the at least one expulsion breccia pipe in a Neoproterozoic or Phanerozoic basin;
analyzing a seismic profile and stratigraphy for the at least one expulsion breccia pipe;
modeling a brine-flow pathway to estimate a location that is most likely to contain a specific type of metallic mineral deposit based on the subsiding sedimentary basin;
employing information about the location of the at least one expulsion breccia pipe to position testing of the geochemistry of material proximate to the at least one expulsion breccia pipe; and
designating an area proximate to the at least one expulsion breccia pipe as a mineral exploration location for at least one mineral wherein the at least one mineral includes an element chosen from uranium, vanadium, copper, silver, chromium, molybdenum, lead, zinc, strontium, antimony, gold, platinum, cobalt, palladium, ruthenium, and lanthanum.

13. A method of exploring for mineral deposits suitable for production, the method comprising:
identifying a plurality of land-based, hydrocarbon producing basins available to an entity;
evaluating a volume of hydrocarbon productivity for each basin;
utilizing a computer to obtain a surface-area image of an area of land;
determining from the surface-area image of the area of land at least one expulsion breccia pipe within at least one of the basins;
locating a subsiding, sedimentary basin of the at least one expulsion breccia pipe in a Neoproterozoic or Phanerozoic basin;
analyzing a seismic profile and stratigraphy for the at least one expulsion breccia pipe;
modeling a brine-flow pathway to estimate a location that is most likely to contain a specific type of metallic mineral deposit based on the subsiding sedimentary basin;
employing information about the location of the at least one expulsion breccia pipe to position testing of the geochemistry of material proximate to the at least one expulsion breccia pipe; and
designating an area proximate to the at least one expulsion breccia pipe as a mineral exploration location for at least one mineral, wherein the at least one mineral includes an element chosen from uranium, vanadium, copper, silver, chromium, molybdenum, lead, zinc, strontium, antimony, gold, platinum, cobalt, palladium, ruthenium, and lanthanum.

14. The method of claim 13:
wherein the volume of hydrocarbon productivity is measured using a total petroleum system analysis.

15. A method of exploring for hydrocarbon resources suitable for production, the method comprising:
identifying at least one known mineral producing region;
utilizing a computer to obtain a surface-area image of an area of land;
determining from the surface-area image of the area of land at least one expulsion breccia pipe proximate to the mineral producing region;
locating a subsiding, sedimentary basin of the at least one expulsion breccia pipe in a Neoproterozoic or Phanerozoic basin;
analyzing a seismic profile and stratigraphy for the at least one expulsion breccia pipe;
determining a burial history, a burial depth, a geometry of basin fill, and an internal basin structure for the subsiding, sedimentary basin;
modeling a brine-flow pathway based on the subsiding sedimentary basin;
employing information about the location of the at least one expulsion breccia pipe to position testing of the geochemistry of material proximate to the at least one expulsion breccia pipe; and
designating an area proximate the at least one expulsion breccia pipe as a hydrocarbon exploration location.

16. A method of exploring for hydrocarbon resources suitable for production, the method comprising:

identifying a hydrocarbon producing basin;
utilizing a computer to obtain a surface-area image of an area of land;
determining from the surface-area image of the area of land at least one expulsion breccia pipe within the hydrocarbon producing basin;
locating a subsiding, sedimentary basin of the at least one expulsion breccia pipe in a Neoproterozoic or Phanerozoic basin;
analyzing a seismic profile and stratigraphy for the at least one expulsion breccia pipe;
determining a burial history, a burial depth, a geometry of basin fill, and an internal basin structure for the subsiding, sedimentary basin;
modeling a brine-flow pathway based on the subsiding sedimentary basin;
determining a dynamic behavior of fluids from the hydrocarbon producing basin based on the presence of the at least one expulsion breccia pipe within the hydrocarbon producing basin;
conducting a search for hydrocarbons based on the determined dynamic behavior of the fluids;
employing information about the location of the at least one expulsion breccia pipe to position testing of the geochemistry of material proximate to the at least one expulsion breccia pipe; and
designating an area proximate the at least one expulsion breccia pipe as a hydrocarbon exploration location.

17. A method of exploring for a hydrocarbon reservoir suitable for production, the method comprising:
utilizing a computer to obtain a surface-area image of an area of land;
determining from the surface-area image of the area of land at least one expulsion breccia pipe present on the area of land;
locating a subsiding, sedimentary basin of the at least one expulsion breccia pipe in a Neoproterozoic or Phanerozoic basin;
analyzing a seismic profile and stratigraphy for the at least one expulsion breccia pipe;
determining a burial history, a burial depth, a geometry of basin fill, and an internal basin structure for the subsiding, sedimentary basin;
modeling a brine-flow pathway based on the subsiding sedimentary basin;
employing information about the location of the at least one expulsion breccia pipe to position testing of the geochemistry of material proximate to the at least one expulsion breccia pipe; and
designating an area proximate the at least one expulsion breccia pipe as a hydrocarbon exploration location.

18. A method of exploring for mineral deposits suitable for production, the method comprising:
utilizing a computer to obtain a surface-area image of an area of land;
determining from the surface-area image of the area of land at least one sand-injectite present on the area of land;
locating a subsiding, sedimentary basin of the at least one sand-injectite in a Neoproterozoic or Phanerozoic basin;
analyzing a seismic profile and stratigraphy for the at least one sand-injectite;
modeling a brine-flow pathway to estimate a location that is most likely to contain a specific type of metallic mineral deposit based on the subsiding sedimentary basin;
employing information about the location of the at least one sand-injectite to position testing of the geochemistry of material proximate to the at least one sand-injectite; and
designating an area proximate to the at least one sand-injectite as a mineral exploration location for at least one mineral, wherein the at least one mineral includes an element chosen from uranium, vanadium, copper, silver, chromium, molybdenum, lead, zinc, strontium, antimony, gold, platinum, cobalt, palladium, ruthenium, and lanthanum.

* * * * *